(12) United States Patent
Islam et al.

(10) Patent No.: US 10,548,100 B2
(45) Date of Patent: Jan. 28, 2020

(54) NON-UNIFORM TRANSMISSION OF SYNCHRONIZATION SIGNALS

(71) Applicant: QUALCOMM Incorporated, San Diego, CA (US)

(72) Inventors: Muhammad Nazmul Islam, Edison, NJ (US); Ozge Koymen, Princeton, NJ (US); Navid Abedini, Raritan, NJ (US); Sundar Subramanian, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 15/462,629

(22) Filed: Mar. 17, 2017

(65) Prior Publication Data

US 2018/0054276 A1 Feb. 22, 2018

Related U.S. Application Data

(60) Provisional application No. 62/377,500, filed on Aug. 19, 2016, provisional application No. 62/456,623, filed on Feb. 8, 2017.

(51) Int. Cl.
*H04W 16/28* (2009.01)
*H04W 56/00* (2009.01)
(Continued)

(52) U.S. Cl.
CPC ...... *H04W 56/0005* (2013.01); *H04B 7/0408* (2013.01); *H04B 7/0617* (2013.01);
(Continued)

(58) Field of Classification Search
CPC .. H04W 72/02; H04W 72/042; H04L 1/0002; H04L 5/0006
See application file for complete search history.

(56) References Cited

U.S. PATENT DOCUMENTS 9,236,916 B2   1/2016 Wernersson et al.
2003/0162551 A1* 8/2003 Atarashi ............. H04B 7/0408
                                                    370/491
(Continued)

FOREIGN PATENT DOCUMENTS

EP    1062746 A2   12/2000
EP    1137304 A2    9/2001
WO    2015042968 A1  4/2015

OTHER PUBLICATIONS

Huawei, et al., "Access Mechanism for Beam Based Approach," 3GPP Draft, R1-166088, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016, Aug. 12, 2016, XP051132464, Retrieved from the Internet: URL:http://www.3gpp.org/ftp/tsg_ran/WG1_RL1/TSGR1_86/Docs/ [retrieved on Aug. 12, 2016].
(Continued)

*Primary Examiner* — Wei Zhao
(74) *Attorney, Agent, or Firm* — Arent Fox LLP

(57) ABSTRACT

The base station that is configured to transmit in a beamformed manner may set different transmission rates for different directions of the beams. During an initial access stage, the base station may set different transmission rates for different transmission directions, and may transmit initial access signals based on the transmission rates in the different transmission directions The apparatus may be a base station. The base station determines transmission rates for a plurality of transmission directions, where each transmission rate is determined for a respective transmission direction of the plurality of transmission directions. The base station transmits at least one initial access signal in each of one or more of the plurality of transmission directions based on a corresponding transmission rate of the transmission rates.

24 Claims, 20 Drawing Sheets

(51) Int. Cl.
*H04B 7/0408* (2017.01)
*H04L 1/00* (2006.01)
*H04L 5/00* (2006.01)
*H04B 7/06* (2006.01)

(52) U.S. Cl.
CPC .......... *H04L 1/0002* (2013.01); *H04L 5/0048* (2013.01); *H04W 16/28* (2013.01)

(56) References Cited

U.S. PATENT DOCUMENTS

| | | | |
|---|---|---|---|
| 2004/0235472 A1* | 11/2004 | Fujishima | H04B 7/0408 455/434 |
| 2008/0144528 A1 | 6/2008 | Graves et al. | |
| 2008/0242332 A1 | 10/2008 | Suh et al. | |
| 2009/0005121 A1 | 1/2009 | Wong et al. | |
| 2009/0010355 A1 | 1/2009 | Mori et al. | |
| 2013/0170435 A1* | 7/2013 | Dinan | H04L 45/50 370/328 |
| 2013/0233922 A1 | 9/2013 | Schoening et al. | |
| 2014/0153536 A1 | 6/2014 | Ouchi et al. | |
| 2015/0264701 A1 | 9/2015 | Ljung | |
| 2015/0365939 A1 | 12/2015 | Zhang et al. | |
| 2016/0087743 A1 | 3/2016 | El et al. | |
| 2016/0099761 A1 | 4/2016 | Chen et al. | |
| 2016/0294451 A1 | 10/2016 | Jung et al. | |
| 2017/0041112 A1* | 2/2017 | Kim | H04W 76/023 |
| 2017/0201974 A1 | 7/2017 | Sohn et al. | |
| 2018/0054790 A1 | 2/2018 | Islam et al. | |

OTHER PUBLICATIONS

Huawei, et al., "Discussion and Evaluation on Braodcast Channel/Signals Transmission for Beam Based Initial Access," 3GPP Draft; R1-1700047, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017, XP051207589, 8 pages, Retrieved from the Internet: URL:http://www.3gpp.org/ftp/Meetings_3GPP_SYNC/RAN1/Docs/ [retrieved on Jan. 16, 2017].
International Search Report and Written Opinion—PCT/US2017/044860—ISA/EPO—dated Oct. 23, 2017.

* cited by examiner

NON-UNIFORM TRANSMISSION OF SYNCHRONIZATION SIGNALS

CROSS-REFERENCE TO RELATED APPLICATION(S)

This application claims the benefit of U.S. Provisional Application Ser. No. 62/377,500, entitled "NON-UNIFORM TRANSMISSION OF SYNCHRONIZATION SIGNALS" and filed on Aug. 19, 2016, and U.S. Provisional Application Ser. No. 62/456,623, entitled "NON-UNIFORM TRANSMISSION OF SYNCHRONIZATION SIGNALS" and filed on Feb. 8, 2017, which are expressly incorporated by reference herein in their entirety.

BACKGROUND

Field

The present disclosure relates generally to communication systems, and more particularly, to wireless communication via beamforming.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A base station (e.g., a millimeter wave base station) may transmit and receive signals in a beamformed manner (e.g., in a directional manner), sweeping through the angular regions in various directions. The base station may set different transmission rates for different directions of the beams. Thus, during an initial access stage, the base station may set different transmission rates for different transmission directions, and may transmit initial access signals based on the transmission rates in the different transmission directions.

In an aspect of the disclosure, a method, a computer-readable medium, and an apparatus are provided. The apparatus may be a base station. The base station determines a plurality of transmission rates, each transmission rate for a respective transmission direction of a plurality of transmission directions. The base station transmits at least one initial access signal in one or more transmission directions of the plurality of transmission directions based on the transmission rate of each transmission direction of the one or more transmission directions.

In an, the apparatus may be a base station. The base station includes means for determining a plurality of transmission rates, each transmission rate for a respective transmission direction of a plurality of transmission directions, and means for transmitting at least one initial access signal in one or more transmission directions of the plurality of transmission directions based on the transmission rate of each transmission direction of the one or more transmission directions.

In an aspect, the apparatus may be a base station including a memory and at least one processor coupled to the memory. The at least one processor is configured to: determine a plurality of transmission rates, each transmission rate for a respective transmission direction of a plurality of transmission directions, and transmit at least one initial access signal in one or more transmission directions of the plurality of transmission directions based on the transmission rate of each transmission direction of the one or more transmission directions.

In an aspect, a computer-readable medium storing computer executable code for a base station includes code to: determine a plurality of transmission rates, each transmission rate for a respective transmission direction of a plurality of transmission directions, and transmit at least one initial access signal in one or more transmission directions of the plurality of transmission directions based on the transmission rate of each transmission direction of the one or more transmission directions.

In another aspect of the disclosure, a method, a computer-readable medium, and an apparatus are provided. The apparatus may be a UE. The UE receives, from a base station, one or more transmission rates of the base station for a plurality of transmission directions, where each transmission rate is determined for a respective transmission direction of the plurality of transmission directions. The UE determines a first transmission rate of the base station corresponding to a first transmission direction of the plurality of transmission directions, where the UE is located in the first transmission direction. The UE configures at least one communication setting for communicating with the base station based on the first transmission rate of the base station.

In an aspect, the apparatus may be a UE. The UE includes means for receiving, from a base station, one or more transmission rates of the base station for a plurality of transmission directions, where each transmission rate is determined for a respective transmission direction of the plurality of transmission directions. The UE includes means for determining a first transmission rate of the base station corresponding to a first transmission direction of the plurality of transmission directions, where the UE is located in the first transmission direction. The UE includes means for configuring at least one communication setting for communicating with the base station based on the first transmission rate of the base station.

In an aspect, the apparatus may be a UE including a memory and at least one processor coupled to the memory. The at least one processor is configured to: receive, from a base station, one or more transmission rates of the base station for a plurality of transmission directions, where each transmission rate is determined for a respective transmission direction of the plurality of transmission directions, determine a first transmission rate of the base station corresponding to a first transmission direction of the plurality of transmission directions, where the UE is located in the first transmission direction, and configure at least one communication setting for communicating with the base station based on the first transmission rate of the base station.

In an aspect, a computer-readable medium storing computer executable code for a UE includes code to: receive, from a base station, one or more transmission rates of the base station for a plurality of transmission directions, where each transmission rate is determined for a respective transmission direction of the plurality of transmission directions, determine a first transmission rate of the base station corresponding to a first transmission direction of the plurality of transmission directions, where the UE is located in the first transmission direction, and configure at least one communication setting for communicating with the base station based on the first transmission rate of the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
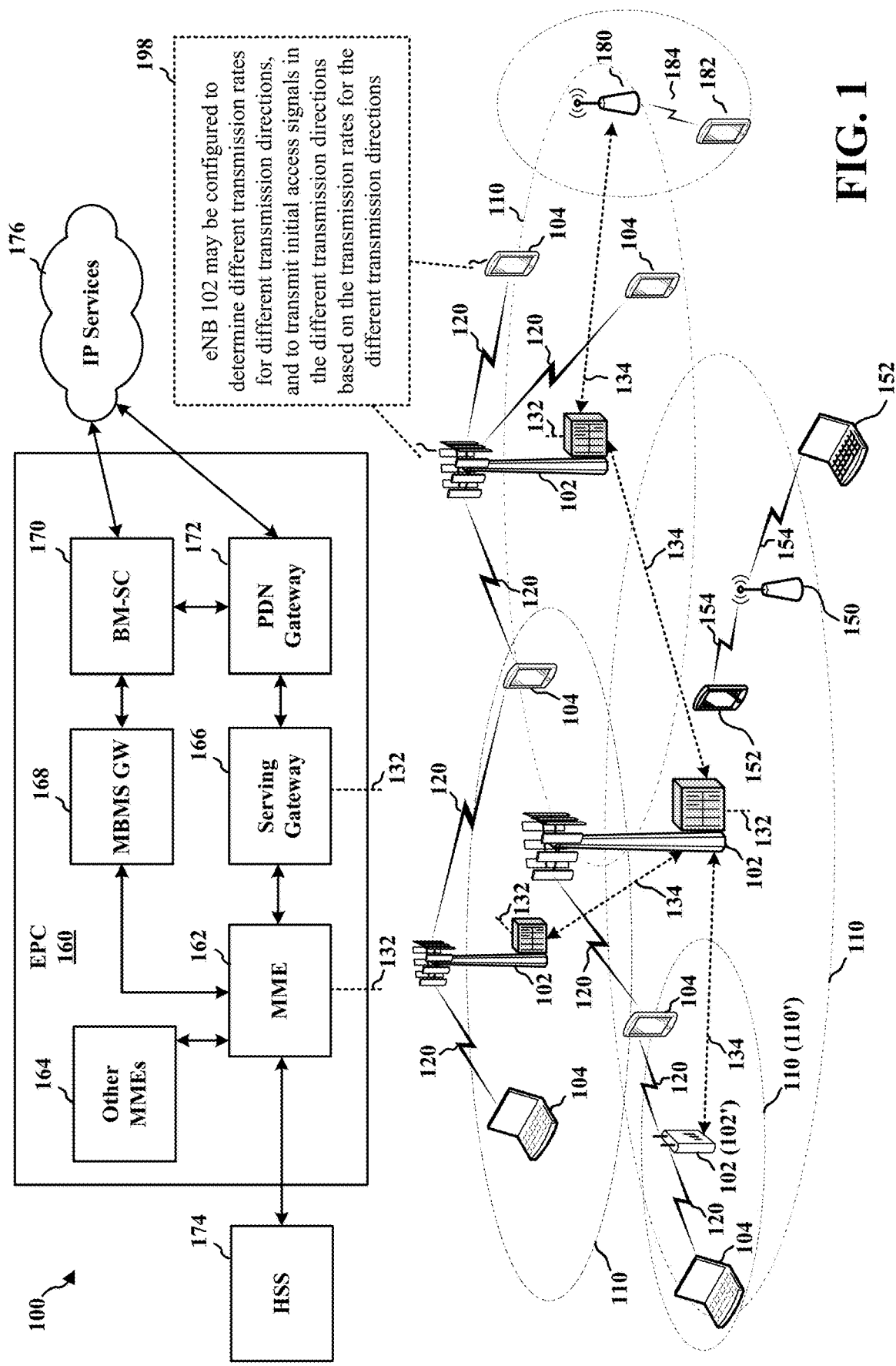
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the eNB 102 may be configured to determine different transmission rates for different transmission directions, and to transmit initial access signals in the different transmission directions based on the transmission rates for the different transmission directions. (198).

Figure 2:
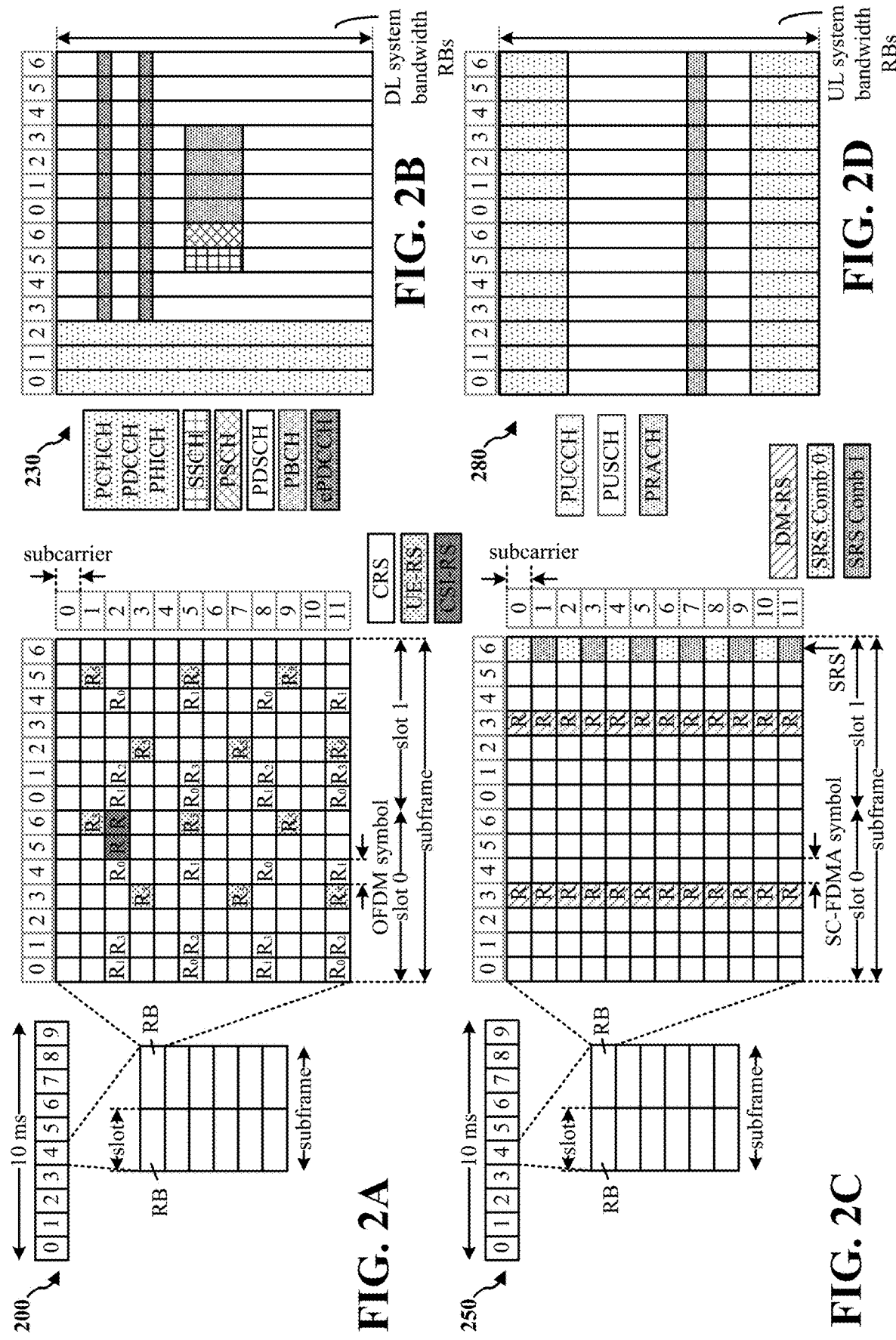
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
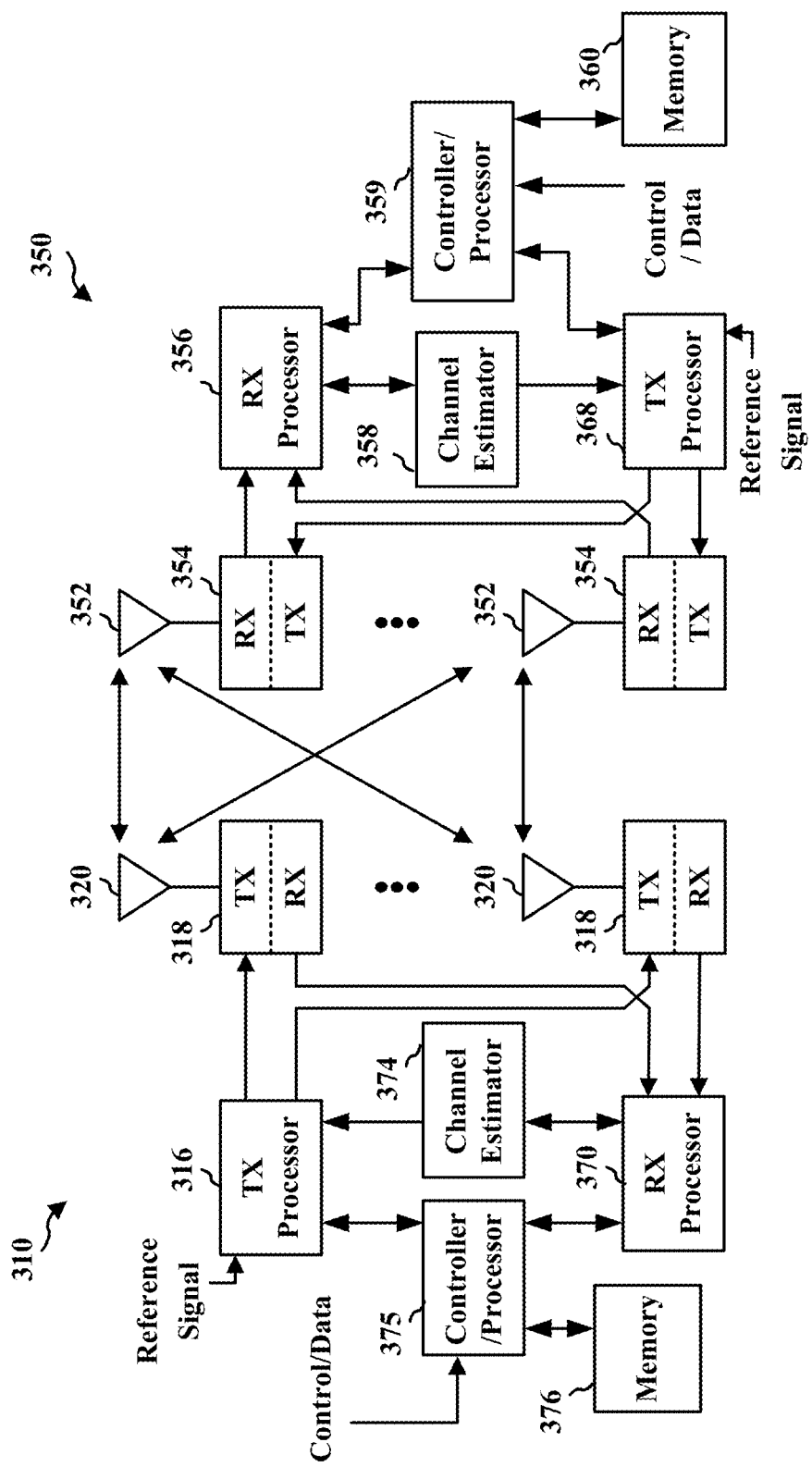
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Wireless communication systems may employ narrow bandwidths and high frequency carriers. For example an mmW system may be utilized for wireless communication at a high transmission rate (e.g., transmitting frequently). In mmW systems, when the carrier frequency is high (e.g., 28 GHz), path loss may be high. For example, the carrier frequency for mmW communication may be 10 times higher than a carrier frequency for other types of wireless communication. Thus, for example, the mmW system may experience path loss that is approximately 20 dB higher than other types of wireless communication cases at lower frequencies. To mitigate the higher path loss in mmW systems, a base station may perform transmission in a directional manner by beam-forming the transmission to focus the transmission in a particular direction.

If the carrier frequency for wireless communication is at a higher frequency, the wavelength of the carrier is shorter. A shorter wavelength may allow a higher number of antennas to be implemented within a given antenna array length than a number of antennas that can be implemented when a lower carrier frequency is used. Therefore, in the mmW system (using a higher carrier frequency), a higher number of antennas may be used in a base station and/or a UE. For example, the BS may have 128 or 256 antennas and the UE may have 8, 16 or 24 antennas. With the higher number of antennas, a beam-forming technique may be used to digitally change the direction of a beam by applying different phases to different antennas. Because beam-forming in an mmW system may provide a narrow beam with increased gain at the receiver, the base station may utilize the narrow beam to transmit a synchronization signal in various directions using multiple narrow beams to provide coverage over a wider area.

Due to the directional nature of a beam-formed beam, for a UE to obtain a desirable gain in the mmW system, the beam from the base station should be focused directly at a UE such that the direction of the beam aligns with the location of the UE in order for the UE to have an acceptable signal characteristic (e.g., signal strength, SNR, gain). If the direction of the beam is not properly aligned, the antenna gain at the UE may be undesirably low (e.g., resulting in low SNR, high block error rates, etc.). Further, when the UE enters the mmW system (e.g., by entering a coverage area of the mmW system or by being activated) and receives transmitted data from the base station over the mmW system, the base station should be able to determine the best beam(s) for mmW communication with the particular UE. Thus, the base station may transmit beam reference signals (BRSs) using beams in multiple directions so that the UE may identify the best beam of the beams received from the base station (e.g., in multiple directions) based on measurements of the BRSs. In the mmW communication system, the base station may also transmit a primary synchronization signal (PSS), a secondary synchronization signal (SSS), an extended synchronization signal (ESS), and PBCH signals for synchronization and for broadcasting system information. In the mmW communication system, such signals may be transmitted directionally via multiple beams to provide a wider coverage area.

Figure 4B:
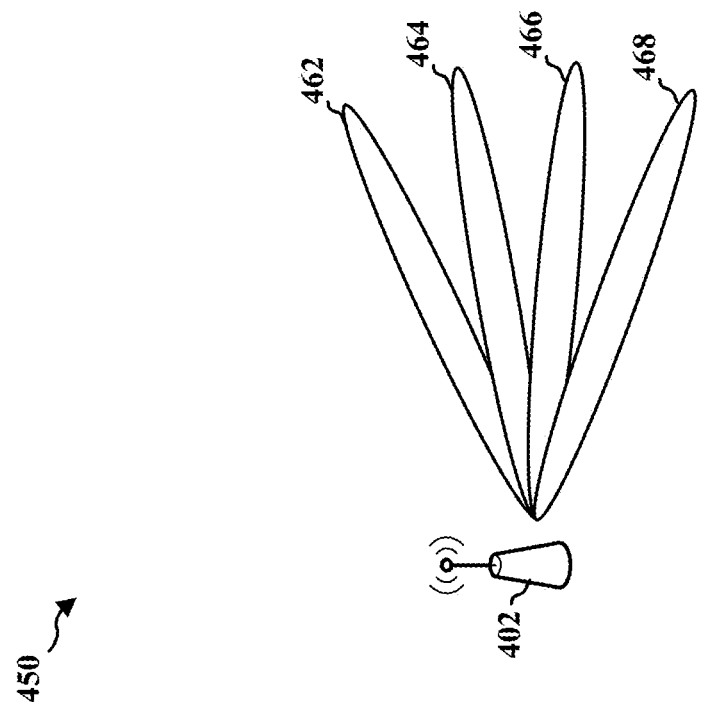
FIG. 4B is an example diagram illustrating transmission of beams in another symbol.
Figure 4A:
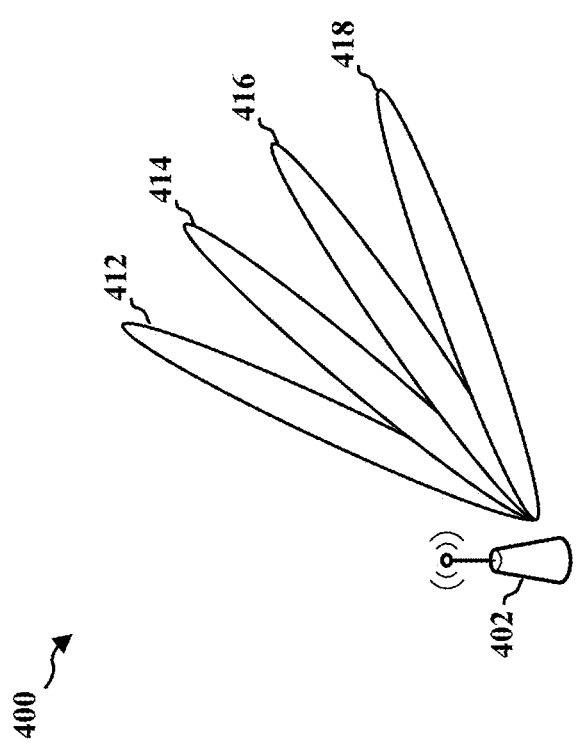
FIG. 4A is an example diagram illustrating transmission of beams in one symbol.

If there are multiple antenna ports (multiple sets of antennas) in the base station, the base station may transmit multiple beams per symbol. For example, the base station may use multiple antenna ports in a cell specific manner in a first symbol of a synchronization sub-frame to sweep in multiple directions. The base station may then sweep in multiple directions using the multiple antenna ports in a cell specific manner in another symbol of the synchronization sub-frame. Each antenna port may include a set of antennas. For example, an antenna port including a set of antennas (e.g., 64 antennas) may transmit one beam, and several antenna ports may transmit multiple beams, each in a different direction. Thus, if there are four antenna ports, the four antenna ports may sweep through four directions (e.g., transmit four beams in four different directions). FIGS. 4A and 4B show example diagrams illustrating the base station sweeping in multiple directions in a first symbol and a second symbol, respectively. As shown in FIGS. 4A and 4B, the base station may sweep in different directions in each symbol, e.g., the angular/directional range of the beams for the example in FIG. 4A is different from the angular/directional range of the beams for the example in FIG. 4B. FIG. 4A is an example diagram 400 illustrating transmission of beams in a first symbol. A base station 402 in this example has four antenna ports, and may transmit four beams 412, 414, 416, and 418 in four different directions in the first symbol. FIG. 4B is an example diagram 450 illustrating transmission of beams in a second symbol. Since the base station 402 has four antenna ports, four beams 462, 464, 466, and 468 may be transmitted in four different directions in the second symbol. The beams transmitted by the base station during the same symbol may not be adjacent with each other.

Figure 5:
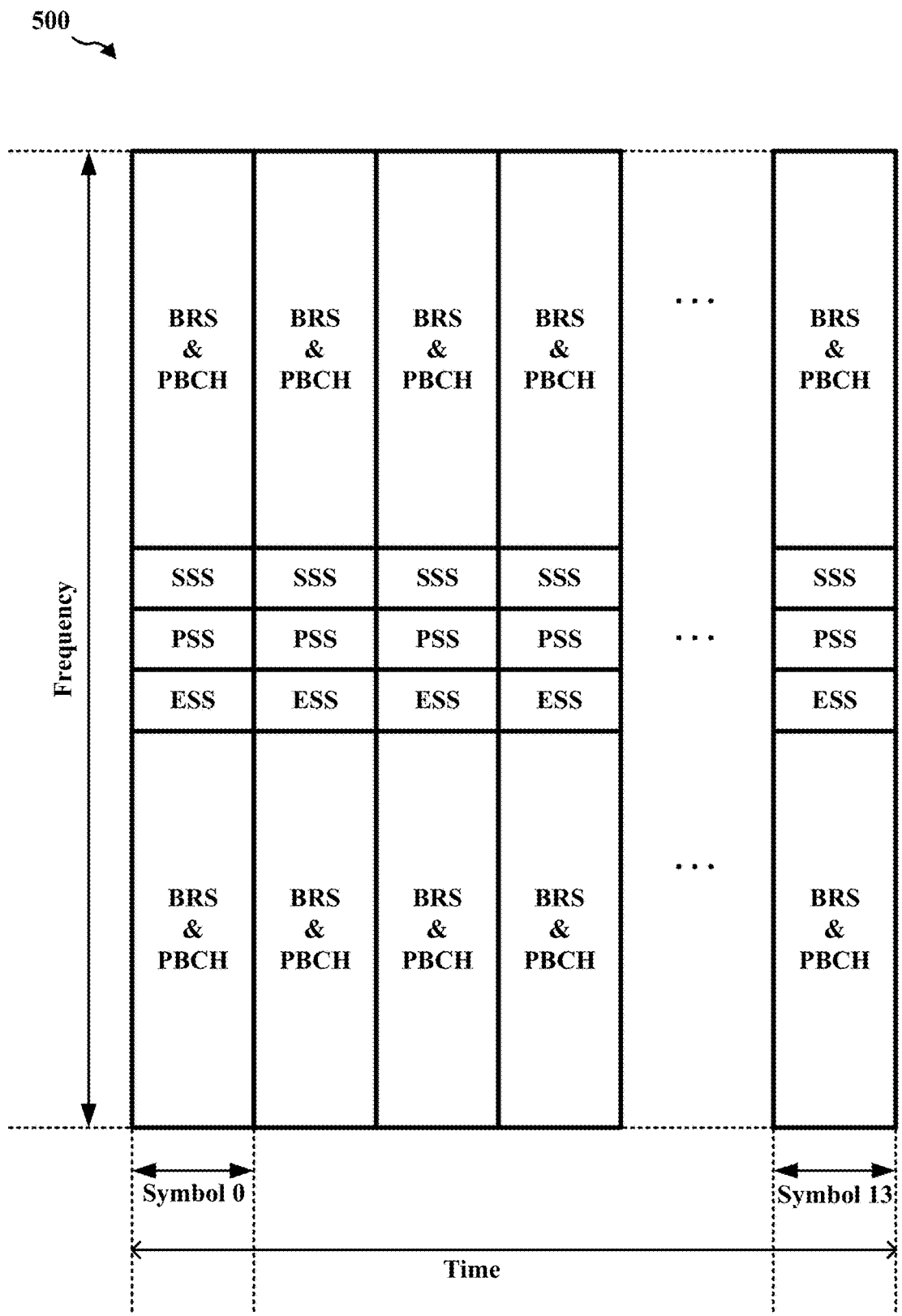
FIG. 5 is an example diagram illustrating a subframe structure for synchronization in a millimeter wave communication system.

FIG. 5 is an example diagram 500 illustrating a synchronization subframe structure for a millimeter wave communication system. The synchronization subframe may be divided into 14 symbols, e.g., from symbol 0 to symbol 13. Within each symbol, 100 subcarriers may be transmitted, where the first 41 RBs are used to carry BRSs and PBCHs, the next 18 RBs are used to carry an SSS, a PSS, and an ESS, and the next 41 RBs are used to carry BRSs and PBCHs.

The beam transmitted by each antenna port may change from symbol to symbol. As discussed above, for example, for a first symbol, four beams from four antenna ports of the base station may cover a first angular range (e.g., as illustrated in FIG. 4A), while four beams from the four antenna ports may cover a second angular range for a different symbol (e.g., as illustrated in FIG. 4B). For example, the base station may have 1, 2, 4, or 8 active antenna ports. Within each symbol, the base station may transmit one or more of a PSS, an SSS, an ESS, a PBCH, and a BRS on each subcarrier. Each of the PSS, the ESS, the SSS, and the PBCH is transmitted by all antenna ports of the base station on the same subcarriers throughout different symbols of the synchronization subframe. The PSS and SSS may be used to obtain the cell identity and the subframe level synchronization. However, PSS and SSS may not provide sufficient information to identify a symbol of the subframe. Therefore, the ESS may be used to indicate a particular symbol. The contents of the ESS may change from symbol to symbol. Therefore, the ESS may be used to indicate a symbol to enable the UE to identify a particular symbol index within the subframe. The ESS may be similar in structure with other synchronization signals such as the PSS and the SSS. For example, the ESS as well as the PSS may be based on a Zadoff Chu sequence (e.g., with length 71). However, unlike the PSS, the Zadoff Chu sequence of each ESS may be cyclically shifted by a different amount, depending on the particular symbol. For example, for each different symbol, the base station cyclically shifts the Zadoff Chu sequence by a different amount to generate a different ESS for each different symbol. When the UE receives the ESS, the UE may be able to determine the symbol index based on the amount of the cyclic shift of the Zadoff Chu sequence of the ESS. If more than one base station, each in different cells, transmit ESSs, the UE may not be able to determine which base station transmitted the ESS. Thus, the Zadoff Chu sequence in the ESS may include cell-specific roots (e.g., by the corresponding base station) that are specific to a particular cell. The cell-specific roots, may enable the UE to identify which base station transmitted the ESS. The Zadoff Chu sequence in the ESS may also be scrambled using a cell-specific sequence, such that the UE may be able to identify which base station transmitted the ESS, based on the cell-specific sequence.

In an aspect, the angular space of the coverage area of a cell may be divided into three sectors, where each sector covers 120 degrees. A base station may provide coverage for one or more sectors. Each symbol of the synchronization subframe may be associated with a different range in direction/angle. For example, the 14 symbols may collectively cover 120 degrees (one sector). In one example, when there are 14 symbols (thus 14 direction ranges) per subframe and there are 4 antenna ports, the base station may transmit beams in 56 (14×4) different directions. In another example, the symbols within a subframe may cover the angular range more than once. In such an example, if there are 14 symbols within a subframe, the first seven symbols may cover 120 degrees, and then the next seven symbols may cover the same 120 degrees.

Figure 6:
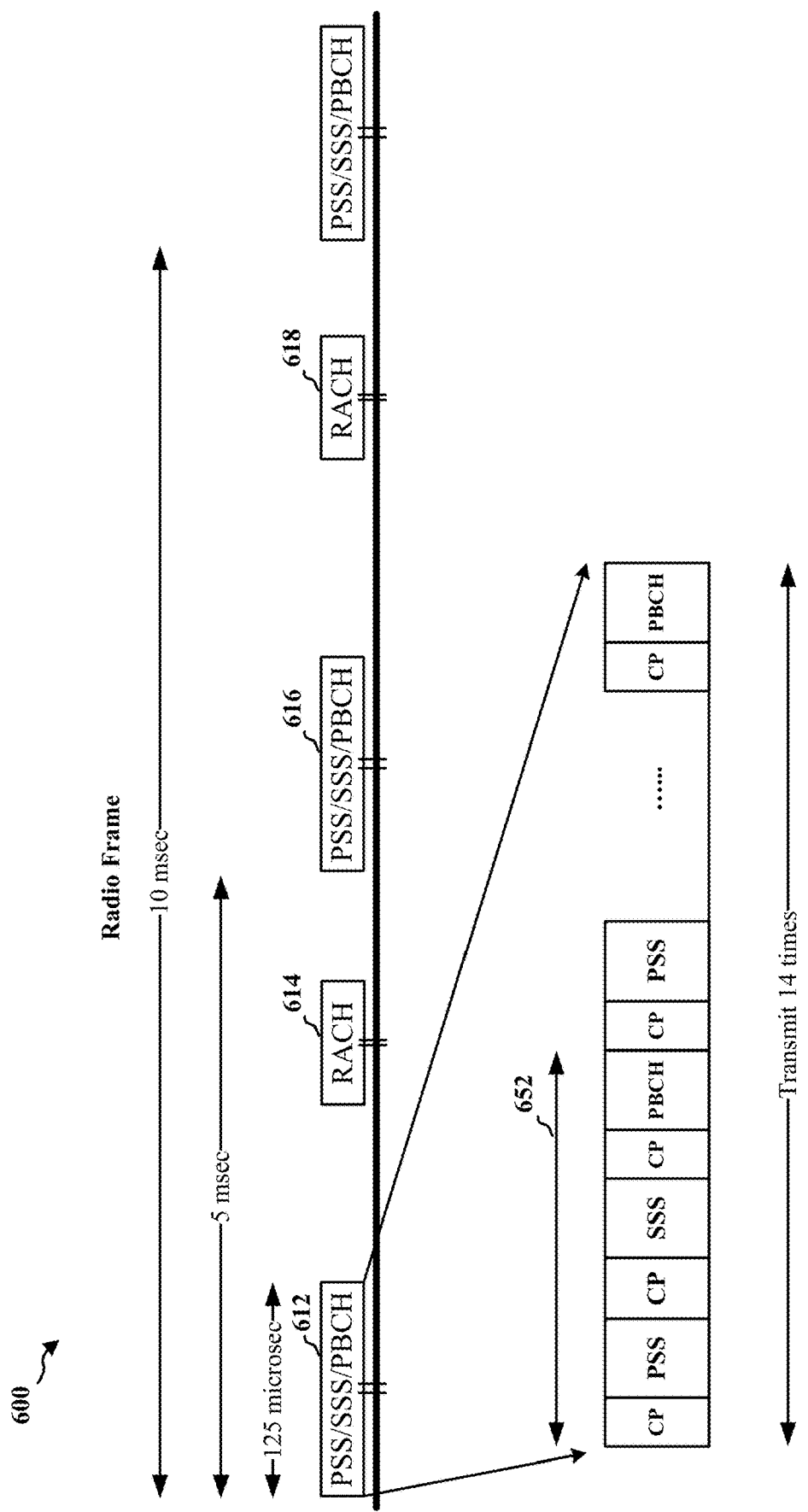
FIG. 6 is an example diagram illustrating transmission of initial access signals.

FIG. 6 is an example diagram 600 illustrating transmission of initial access signals. The base station may transmit one or more initial access signals (such as a PSS, an SSS, a PBCH signal, a BRS signal) twice within one radio frame. In this example, because the radio frame is 10 milliseconds long, the base station may transmit initial access signals every 5 milliseconds. In particular, the base station may use a first channel 612 within a radio frame to transmit the initial access signals a first time, and then use a second channel 616 to transmit the initial access signals a second time. A RACH signal 614 may be transmitted between the first channel 612 and the second channel 616. A RACH signal 618 may be transmitted after the second channel 616. In this example, the base station processes the initial access signals such that there is cyclic prefix between the initial access signals in the processed initial access signal 652. The initial access signals may be processed by time-division multiplexing the initial access signals. In the example diagram 600, the initial access signals may be processed by time-division multiplexing the PSS, the SSS, and the PBCH. In this case, because there are fourteen symbols, transmission of the processed initial access signal 652 may be performed fourteen times via beam-forming in fourteen directions in a sweeping manner (e.g., to cover the entire sector). The tone spacing for each of the initial access signals in the processed initial access signal 652 is 120 kHz. The PBCH signal may be frequency-division multiplexed with a BRS and/or an ESS.

As discussed above, path loss (e.g., free space path loss) increases as a carrier frequency increases. The free space path loss is path loss that results from a line-of-sight path through free space (e.g., air) for a signal transmission, with no obstacles nearby to cause reflection or diffraction of the signal. In an mmW system utilizing beam-formed beams transmitted in various directions, if a UE is not aligned with a direction of a beam from the base station, the antenna gain at a UE for the beam may be reduced and higher free space path loss may result. In addition, communication in an mmW system may suffer from additional non-line-of-sight path losses that are not caused by the UE not being aligned with the direction of a beam. Such non-line-of-sight losses may include, for example, diffraction loss (e.g., signal loss caused by an object such as a building blocking a signal), penetration loss (e.g., signal loss due to a signal penetrating an object such as a wall), oxygen absorption loss (e.g., signal loss caused by the atmosphere), foliage loss (e.g., signal loss when a signal passes through leaves), etc. During an initial access stage where a UE and a base station communicate with each other to discover each other and establish connection each other, the base station and UE may be configured to minimize various types of path loss describe above.

During an initial access stage, a base station may transmit initial access signals (e.g., a PSS, an SSS, an ESS, a PBCH, a BRS) to the UE to establish a connection between the base station and the UE, and the UE may transmit random access signals (e.g., random access channel (RACH) signals) to the base station. For example, during a synchronization period and a random access period in the initial access stage, the base station may utilize at least one of the following two beamforming approaches to compensate for the high free space path loss and additional non-line-of-sight losses. According to one approach, the base station may divide the entire angular region surrounding the base station into multiple angular regions, and may transmit the initial access signals and receive the random access signals in a beam-formed manner (e.g., in a directional manner), sweeping through the angular regions in various directions (e.g., in an azimuth direction and/or an elevation direction). According to another approach, the base station may transmit the initial access signals and may receive the random access signals for a longer duration, using a pseudo-omni beam. The pseudo-omni beam is a beam that covers a large angular region surrounding the base station with uniform signal strength, which is different from beam-forming in a directional manner.

The beam sweeping in different directions with different beams may be advantageous in that different transmission rates (e.g., different frequencies of transmission) may be used for different beams in different directions. If the base station is configured to transmit multiple beams in different directions (in a directional manner), the base station may transmit initial access signals via the multiple beams in the different directions based on different transmission rates. For example, the base station may transmit the initial access signal more frequently (e.g., higher transmission rate) in one direction and may transmit the initial access signal less frequently (e.g., lower transmission rate) in another direction. Because different transmission rates may be used to transmit the initial access signals in different transmission directions, the base station may be configured to prioritize some directions over other directions, e.g., by utilizing a higher transmission rate for some directions (e.g., higher priority directions) and a lower transmission rate for other directions (e.g., lower priority directions). According to an aspect of the disclosure, the base station may configure a transmission rate of an initial access signal from the base station for a particular transmission direction of a beam (or a group of beams), and transmit the initial access signal using the configured transmission rate for the particular transmission direction. In an aspect, the base station may determine a transmission rate for a particular transmission direction based on a number of UEs aligned in a particular transmission direction. Thus, the base station may identify particular directions where more UEs are present or are likely to be present and may transmit initial access signals in such particular directions more frequently (e.g., with a higher transmission rate). For example, if the base station determines that more UEs are present in a particular angular region, then the base station may transmit initial access signals more frequently in transmission directions that are within the particular angular region. Similarly, in an aspect, if the base station identifies particular directions where more UEs are absent or likely to be absent, the base station may transmit the initial access signals less frequently in such particular directions (e.g., with a lower transmission rate) or may avoid transmitting initial access signals in such particular directions. For example, the base station may determine whether more UEs are present in a particular direction by receiving certain signals from UE(s), as discussed more in detail infra.

In one use example, if an mmW base station is located near a subway station, the mmW base station may transmit initial access signals more frequently in transmission directions toward an entry area and/or an exist area of the subway station because more UEs, e.g., UEs carried by people, are expected in the entry area and/or the exit area. In another use example, if an mmW base station is located near absorber panels that are not capable of reflecting signals, the mmW base station may be configured to transmit initial access signals less frequently in transmission directions toward the absorber panels because the absorber panels cannot reflect the initial access signals to UEs that are located in opposing directions from the absorber panels. For example, because the absorber panels may prevent the base station's signals from dispersing in different directions by absorbing the base station's signals, transmitting signals at a higher transmission rate (e.g., more frequently) toward the absorber panels may not be advantageous.

In an aspect, the base station may receive information regarding transmission rates for different transmission directions from a network entity. The network entity may be a centralized controller or a master base station in a centralized network, where the master base station is connected to multiple base stations to manage the multiple base stations. The master base station may include information regarding a number of UEs aligned in each of the plurality of transmission directions. Based on the information regarding the transmission rates received from the network entity, the base station may determine the transmission rates for different transmission directions.

Figure 7B:
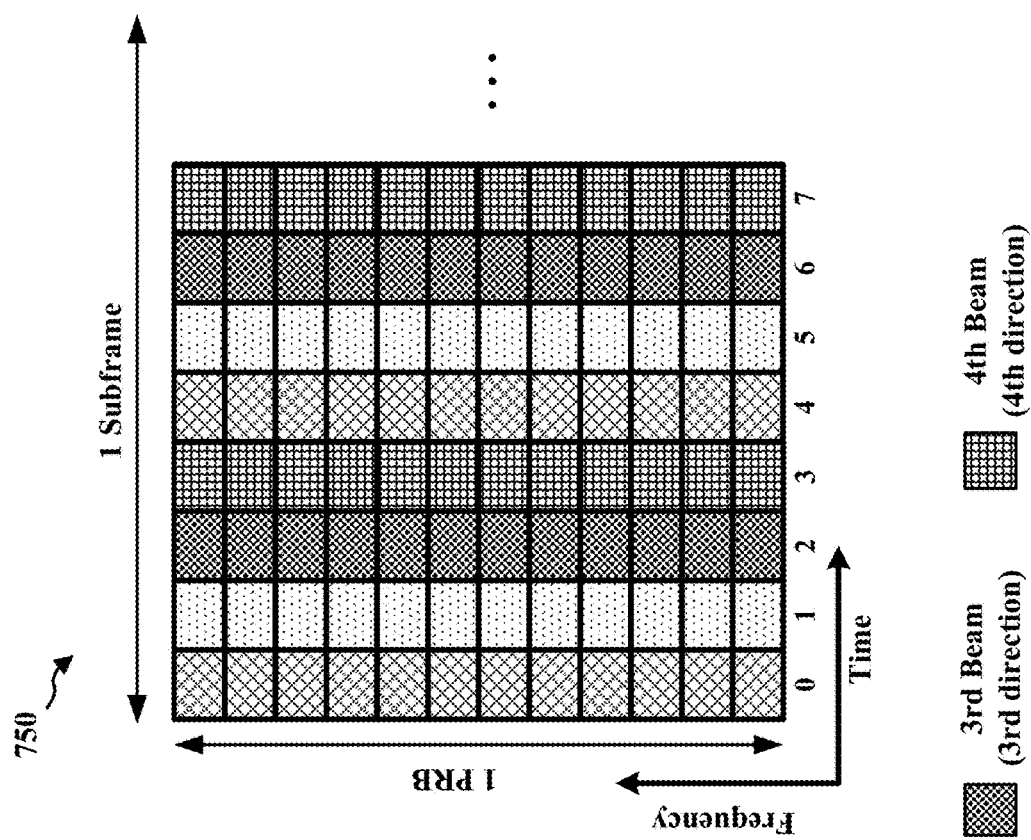
FIGS. 7A and 7B are example diagrams illustrating a first scenario with a uniform transmission rate across various transmission directions.
Figure 7A:
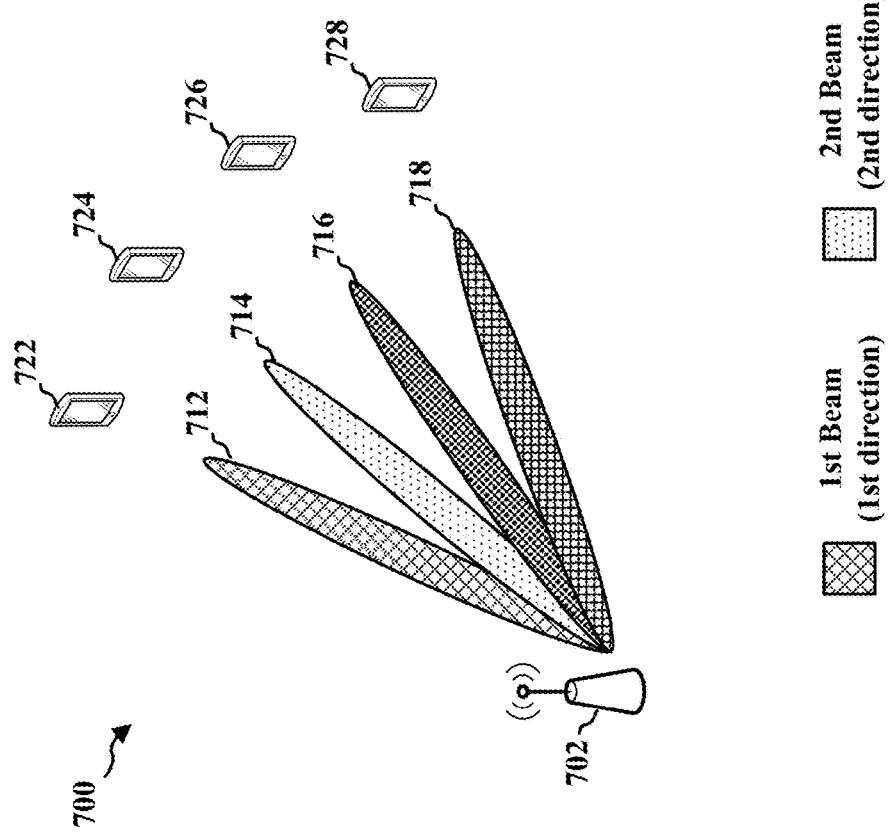

FIGS. 7A and 7B are example diagrams illustrating a first scenario with a uniform transmission rate across various transmission directions. FIG. 7A is an example diagram 700 illustrating transmission of beams in a symbol, according to the first scenario. Base station 702 may have four antenna ports, and thus may transmit four beams including a first beam 712, a second beam 714, a third beam 716, and a fourth beam 718 in four different transmission directions in the symbol. In the example diagram 700, a first UE 722, a second UE 724, a third UE 726, and a fourth UE 728 are uniformly distributed across the four different transmission directions of the first, second, third, and fourth beams 712, 714, 716, and 718. Thus, the base station 702 may configure a transmission rate of an initial access signal for each of the four different transmission directions uniformly. FIG. 7B is an example diagram 750 illustrating resource usage for transmissions of initial access signals in different transmission directions, according to the first scenario. In the example diagram 750, time slot 0 is used to transmit the initial access signal in the first transmission direction via the first beam 712, time slot 1 is used to transmit the initial access signal in the second transmission direction via the second beam 714, time slot 2 is used to transmit the initial access signal in the third transmission direction via the third beam 716, and time slot 3 is used to transmit the initial access signal in the fourth transmission direction via the fourth beam 718. Further, time slot 4 is used to transmit the initial access signal in the first transmission direction via the first beam 712, time slot 5 is used to transmit the initial access signal in the second transmission direction via the second beam 714, time slot 6 is used to transmit the initial access signal in the third transmission direction via the third beam 716, and time slot 7 is used to transmit the initial access signal in the fourth transmission direction via the fourth beam 718. Thus, in the first scenario, the transmission rate of initial access signals is the same for all four directions. Such a pattern of transmitting initial access signals in the four transmission directions may be repeated.

Figure 8B:
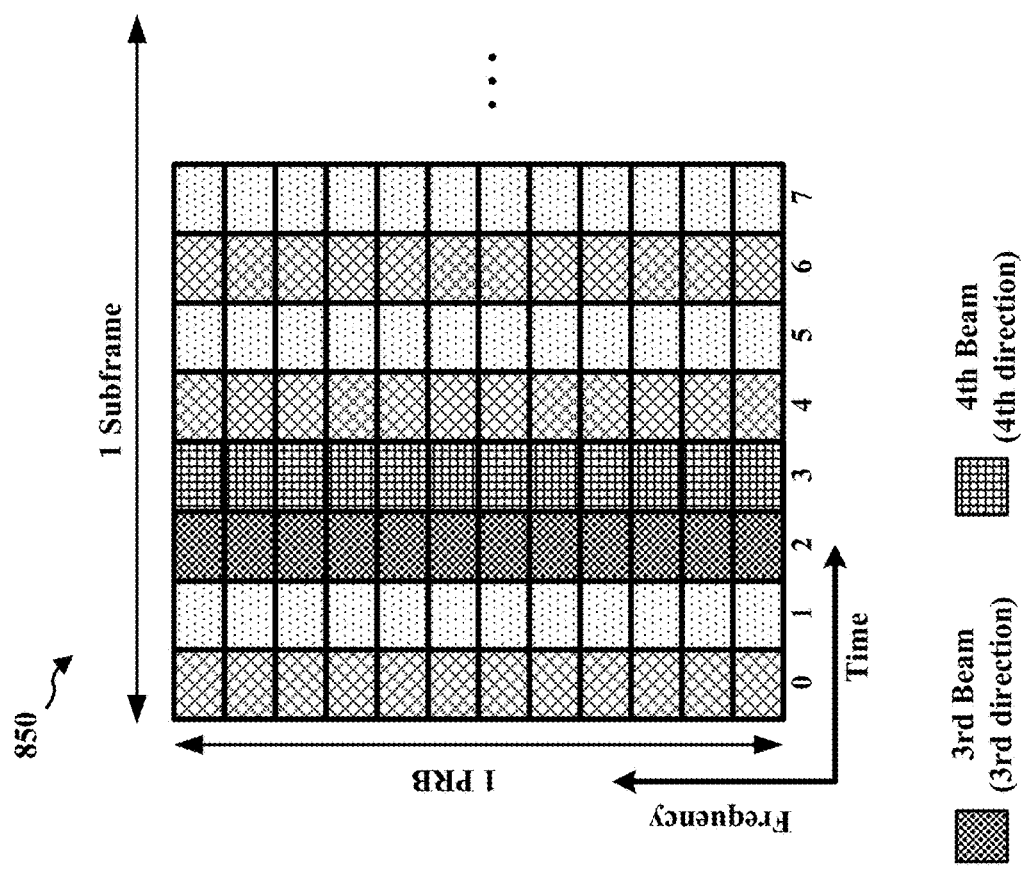
FIGS. 8A and 8B are example diagrams illustrating a second scenario with different transmission rates for different groups of transmission directions
Figure 8A:
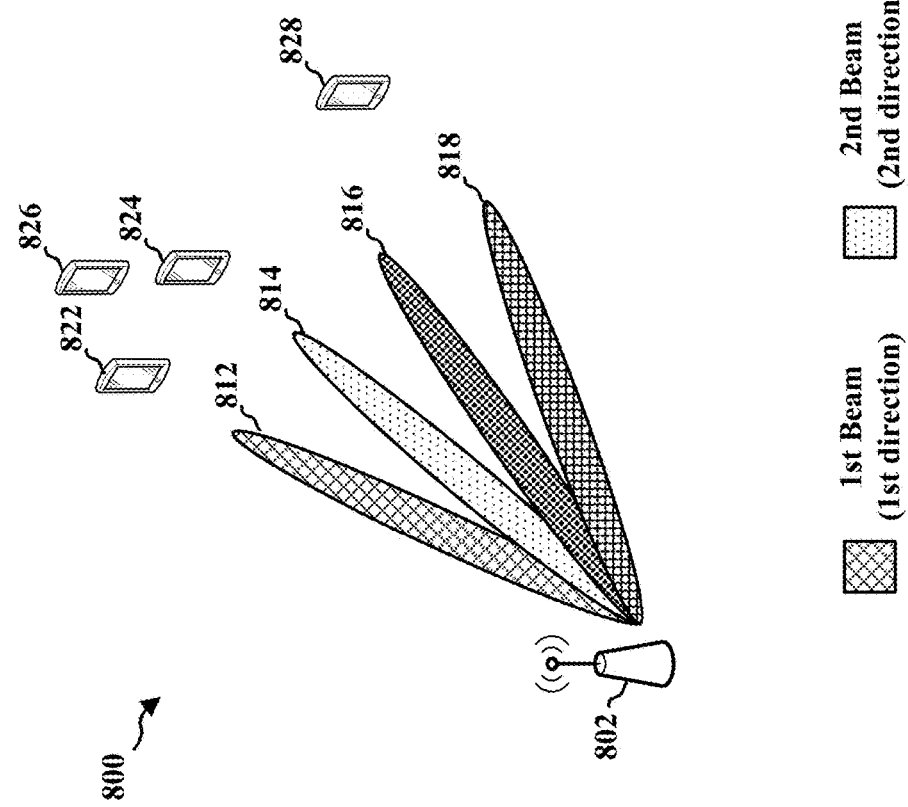

FIGS. 8A and 8B are example diagrams illustrating a second scenario with different transmission rates for different groups of transmission directions. FIG. 8A is an example diagram 800 illustrating transmission of beams in a symbol, according to the second scenario. A base station 802 may have four antenna ports, and may transmit four beams including a first beam 812, a second beam 814, a third beam 816, and a fourth beam 818 in four different transmission directions in the symbol. In the example diagram 800, a first UE 822, a second UE 824, and a third UE 826 are located in an angular region where the first beam 812 in the first transmission direction and the second beam 814 in the second transmission direction are transmitted. A fourth UE 828 is located in an angular region where the third beam 816 in the third transmission direction and the fourth beam 818 in the fourth transmission direction are transmitted. Thus, the base station 802 may configure a higher transmission rate of an initial access signal for each of the first and second transmission directions, and configure a lower transmission rate of an initial access signal for each of the third and fourth transmission directions. FIG. 8B is an example diagram 850 illustrating resource usage for transmissions of initial access signals in different transmission directions, according to the second scenario. In the example diagram 850, time slot 0 is used to transmit the initial access signal in the first transmission direction via the first beam 812, time slot 1 is used to transmit the initial access signal in the second transmission direction via the second beam 814, time slot 2 is used to transmit the initial access signal in the third transmission direction via the third beam 816, and time slot 3 is used to transmit the initial access signal in the fourth transmission direction via the fourth beam 818. Then, time slot 4 is used to transmit the initial access signal in the first transmission direction via the first beam 812, time slot 5 is used to transmit the initial access signal in the second transmission direction via the second beam 814, time slot 6 is used to transmit the initial access signal in the first transmission direction via the first beam 812, and time slot 7 is used to transmit the initial access signal in the second transmission direction via the second beam 814. Thus, within the eight time slots (time slots 0-7), the base station is configured to transmit in the first and second transmission directions with a transmission rate that is three times higher than a transmission rate for transmitting in the third and fourth transmission directions because more UEs are present in the first and second transmission directions than in the third and fourth transmission directions. Such a pattern of transmitting initial access signals in the four transmission directions may be repeated.

In an aspect, the base station may determine a transmission rate for a particular direction based on a number of random access signal that the base station has received in the particular direction. The random access signal may be transmitted by a UE, and may be a RACH signal. For example, if more random access signals are received in a particular direction, the base station may determine that more UEs are present in the particular direction. In an aspect, the base station may consider a past history of reception of random access signals at the base station, and may determine whether more random access signals are received in a particular direction than another direction. If the base station receives more random access signals in a particular direction, the base station may configure a transmission rate for the particular direction to be higher than a transmission rate of another direction.

In an aspect, the base station may determine the a transmission rate in a particular transmission direction based on a number of scheduling requests that the base station receives in the particular transmission direction. The scheduling request may be transmitted by a UE. Thus, for example, if more scheduling requests are received in a particular direction, the base station may determine that more UEs are present in the particular direction. Thus, if the base station receives more scheduling requests in a particular direction than another direction, the base station may configure a transmission rate for the particular direction to be higher than a transmission rate of another direction.

In an aspect, the base station may determine the a transmission rate in a particular transmission direction based on a number of beam training requests that the base station receives in the particular transmission direction. The beam training request may be transmitted by a UE. Thus, example, if more beam training requests are received in a particular direction, the base station may determine that more UEs are present in the particular direction. Thus, if the base station receives more beam training requests in a particular direction than another direction, the base station may configure a transmission rate for the particular direction to be higher than a transmission rate of another direction.

In an aspect, the base station may determine the a transmission rate in a particular transmission direction based on a number of beam recovery requests that the base station receives in the particular transmission direction. The beam recovery request may be transmitted by a UE. Thus, example, if more beam recovery requests are received in a particular direction, the base station may determine that more UEs are present in the particular direction. Thus, if the base station receives more beam recovery requests in a particular direction than another direction, the base station may configure a transmission rate for the particular direction to be higher than a transmission rate of another direction.

In an aspect, the base station may transmit the base station's transmission rates for different transmission directions to one or more UEs. In one approach, the base station may transmit all of the base station's transmission rates for different transmission directions by broadcasting the base station's transmission rates. In another approach, the base station may transmit all of the base station's transmission rates for different transmission directions to a UE via a unicast transmission. In another approach, the base station may transmit, to each UE, the base station's transmission rate(s) for transmission direction(s) with which each UE is aligned, via a unicast transmission. When a unicast transmission is used, the base station may transmit the base station's transmission rate(s) using RRC signaling and/or a random access response (e.g., RACH message 2 (MSG2)).

In an aspect, the base station may transmit the information about transmission rates for different transmission directions via a MIB and/or a SIB. The MIB may be transmitted via a PBCH. The SIB may be transmitted via at least one of a PBCH, an extended PBCH, or RRC signaling.

When the UE receives base station's transmission rate(s), the UE may determine the base station's transmission rate(s) for a particular transmission direction that is aligned with the UE. In one example, the UE may determine that a particular transmission direction of the base station is aligned with the UE if a signal strength or an SNR is the highest in the particular transmission direction among transmission directions of the base station. In an aspect, the base station may convey to the UE information about the particular direction aligned with the UE and a transmission rate for the particular direction. Based on the base station's transmission rate(s), a UE may configure certain communication settings for communicating with the base station. In an aspect, the UE may configure an activation time to indicate how often to wake up to activate a connection of the UE with the base station, based on a transmission rate of the base station for a particular transmission direction aligned with the UE. For example, the UE may determine to wake up less often to conserve power if the transmission rate of the base station is lower in the particular transmission direction with which the UE is aligned. On the other hand, the UE may determine to wake up more often if the transmission rate of the base station is higher for the particular transmission direction with which the UE is aligned. In an aspect, the UE may activate the connection with the base station in response to receiving paging information from the base station.

Figure 9:
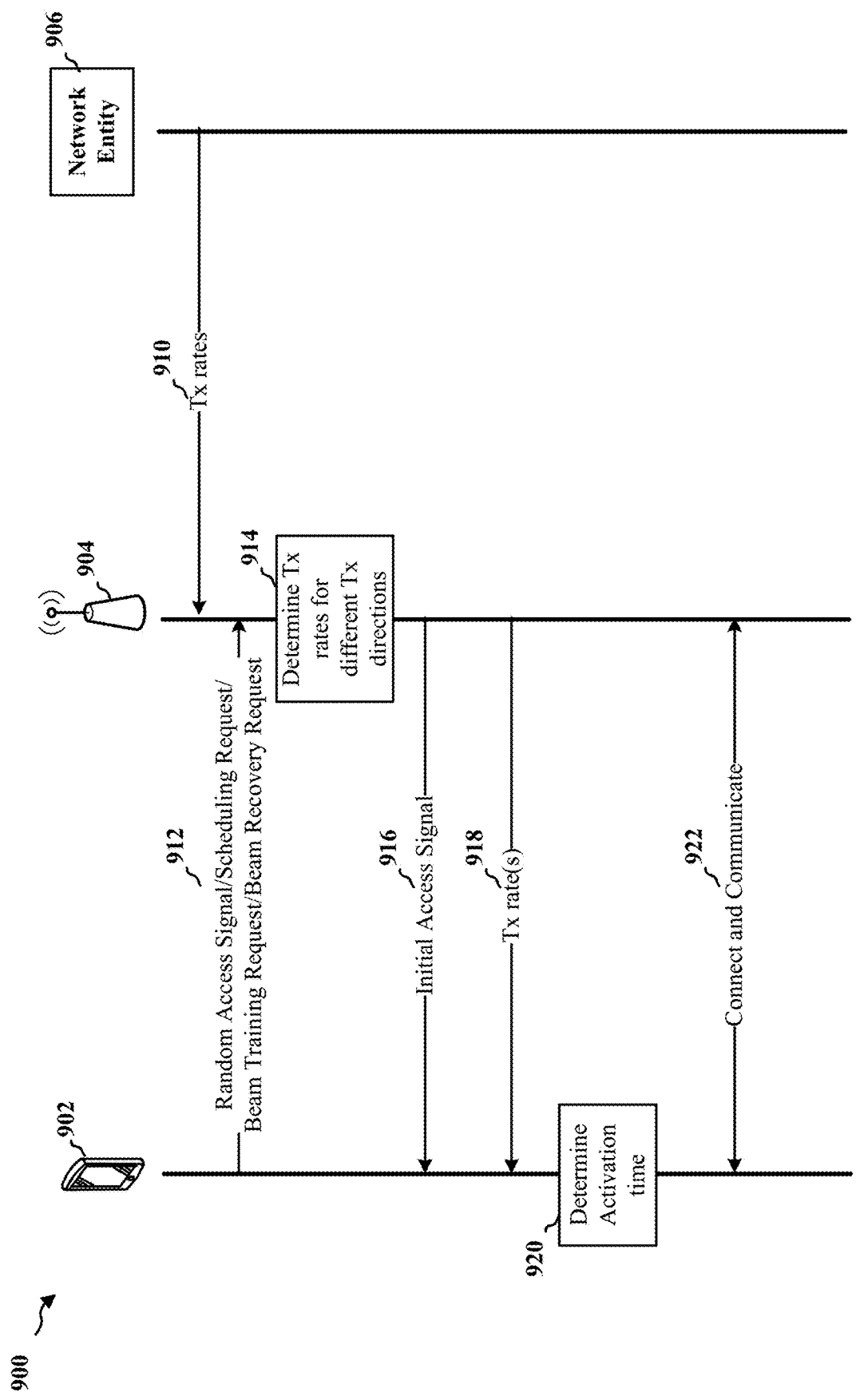
FIG. 9 is a diagram illustrating an example process according to an aspect of the disclosure.

FIG. 9 is a diagram 900 illustrating an example overall process according to an aspect of the disclosure. The example diagram 900 involves communication among a UE 902, a base station 904, and a network entity 906. The base station 904 may be an mmW base station capable of communicating in a beam-formed manner (e.g., using directional beams). At 910, the base station 904 may receive, from the network entity 906, information about transmission rates for different transmission directions. At 912, the base station 904 may receive, from the UE 902, at least one of a random access signal, a scheduling request, a beam training request, or a beam recovery request. At 914, the base station 904 may determine transmission rates of the base station for different transmission directions, where each different transmission direction respectively corresponds with a different beam. The base station 904 may determine the transmission rates based on the information received from the network entity 906 and/or a number of random access signals/scheduling requests/beam training requests/beam recovery requests received from the UE 902 and other UEs in the transmission direction where the UE 902 is aligned. At 916, the base station may transmit an initial access signal to the UE 902 based on a transmission rate for the transmission direction aligned with the UE 902.

At 918, the base station may transmit the transmission rate(s) of the base station for the transmission direction where the UE 902 is aligned. At 920, the UE 902 may determine, based on the received transmission rate of the base station, an activation time at which the UE 902 wakes up to connect with the base station 904. At 922, the UE may wake up, based on the activation time, to connect with the base station 904 and communicate with the base station 904. In one example, after receiving the transmission rate for the transmission direction aligned with the UE 902, the UE 902 may enter a disconnected mode, being disconnected from the base station 904. Because the UE 902 has received the transmission rate, UE 902 may determine a set of activation times based on the transmission rate, such that the UE 902 may wake up from the disconnected mode at the set of activation times, in order to establish a connection with the base station 904 (e.g., to enter a connected mode) and to receive the initial access signal from the base station 904.

For some communication conditions, assigning more beams of the base station in a particular area may be desired. For example, UEs may not be uniformly located throughout a coverage area surrounding the base station (e.g., in the coverage area of the base station). If more UEs are located in a particular area, assigning more beams for transmission in the particular area may be desired to reach more UEs. In other words, assigning more beams in an area where UEs are more densely located than in an area where UEs are less densely located may increase the number of UEs reachable by the base station. Hence, in an aspect of the disclosure, a base station may divide a coverage area surrounding the base station into sub-regions (e.g., based on a density of UEs in various portions of the coverage area), such that the base station may transmit the initial access signal per sub-region (e.g., using a beam directed in a direction corresponding to a respective sub-region). The coverage area surrounding the base station may be expressed in an angular range, and each sub-region may cover a respective portion of the angular range. The sub-regions may be non-uniform in size and/or portion of the angular range covered. In an aspect, the base station may divide the surrounding area (e.g., coverage area) into non-uniform angular sub-regions.

The base station may have limited resources that allow utilization of a certain number of beams (e.g., simultaneously). Thus, a number of beams allowed by the resources may determine a number of sub-regions in the surrounding region (e.g., coverage area) of the base station. The base station may assign one beam or one set of beams of the base station per sub-region. In an aspect, the same number of beams or approximately the same number of beams may be assigned to each sub-region. In an aspect, one beam may be assigned to each sub-region, and thus a number of sub-regions may be the same as a number of beams. For example, if the base station has sufficient resources for 3 beams to cover a surrounding region, the base station may divide the surrounding region into three sub-regions and may assign one beam to each sub-region. In another aspect, more than one beam may be assigned to each sub-region. For example, if the base station is configured to divide the surrounding region into three sub-regions and has sufficient resources for 6 beams, the base station may assign two beams to each sub-region. Thus, a number of beams assigned per sub-region may be based on the number of beams allowed by the resources and a number of sub-regions configured by the base station. In an aspect, the base station may assign more than one beam per sub-region if a number of beams allowed by the resources is greater than a threshold, where the threshold is a maximum number of sub-regions configured by the base station. For example, if the threshold is 4 and a number of beams allowed by the resources is 7, the base station may allocate 2 beams to each of three sub-regions and 1 beam to a remaining sub-region. When assigning the beams to sub-regions, the base station may steer each beam such that a direction of each beam aligns with a corresponding sub-region. For example, if an angular sub-region exists between 0 and 60 degrees, the base station may steer a beam such that a direction of each beam aligns with a mid-point of a corresponding angular sub-region, which is at 30 degrees.

After assigning a beam or a set of beams to each sub-region, the base station may steer beams of the base station in directions corresponding to the sub-regions such that each beam may be used to transmit the initial access signal in the corresponding sub-region. For example, if the base station is configured to utilize three beams (e.g., via beamforming) and the coverage area is divided into three sub-regions, the base station may assign one of three beams per sub-region. The beams may be beams of mmW communication, and thus the initial access signal may be transmitted via a mmW transmission. The same transmission rate may be used for each beam to transmit the initial access signal.

The base station may determine the sub-regions based on a number of UEs per unit angular region or per unit area. In particular, the base station may determine sub-regions such that each sub-region has approximately the same number of UEs. That is, sub-regions may be determined such that a sub-region with a lower density of UEs may cover a larger angular area than a sub-region with a higher density of UEs, in order to provide each sub-region having approximately the same number of UEs. Thus, the base station may determine a smaller sub-region for an area with more UEs per area. For example, the base station may identify a first particular region where more UEs per area are present or are likely to be present and may divide the first particular region into smaller sub-regions. Because approximately the same number of beams is assigned to each sub-region, if the first particular region is divided into smaller sub-regions, more beams may be assigned to the first particular region with more UEs per area than another region having fewer UEs per area and thus divided into larger sub-regions. Further, the base station may identify a second particular region where less UEs per area are present or are likely to be present and may divide the second particular region into one or more larger sub-regions, such that less beams may be assigned to the second particular region with less UEs per area than another region having more UEs per area (e.g., higher UE density) and thus divided into more sub-regions of smaller size. Hence, in an aspect, the base station may determine sub-regions such that a number of UEs per each sub-region is distributed through the different sub-regions in a substantially uniform manner. In one example, if a base station is capable of transmitting within a total angular range from −60 degrees to 60 degrees (e.g., a total range of 120 degrees) and a first set of three UE are located at an angular region covering −60 degrees to 0 degree, a second set of three UEs are located in an angular region covering 0 degree to 30 degrees, and a third set of three UEs are located in an angular region covering 30 degrees to 60 degrees, the base station may divide the total angular range to a first angular sub-region covering −60 degrees to 0 degree, a second angular sub-region covering 0 degree to 30 degrees, and a third angular sub-region covering 30 degrees to 60 degrees, such that the same number of UEs is located in each angular sub-region.

In an aspect, the base station may estimate a density of UEs in a particular region based on a number of UE signals received by the base station using a beam pointing in a direction corresponding to the particular region. The direction corresponding to the particular region may be located at a mid-point of the angular coverage of the particular region. For example, if the angular coverage of the particular region covers 0 degrees to 60 degrees, the mid-point of the particular region is at 30 degrees, which is the beam direction of the beam providing coverage to the particular region.

In an aspect, the base station may initially divide the coverage area surrounding the base station into a set of unit angular ranges, such that the base station may estimate a number of UEs per unit angular rage and determine sizes of sub-regions based on the number of UEs per unit angular rage. Thus, different unit angular ranges cover different parts of the region surrounding the base station. Each unit angular range may have the same angular range size. For example, for each unit angular range of a set of unit angular ranges, the base station may receive UE signals from UEs while a beam of the base station points to a direction corresponding to a corresponding unit angular range. For example, the base station may estimate a number of UEs per unit angular range (e.g., density of UEs) through various angular regions surrounding the base station based on the UE signals received by the base station using a beam pointing to each unit angular rage. In one example, to receive UE signals from UEs in different unit angular ranges, the base station may sweep in multiple directions corresponding to respective unit angular regions over the total area (e.g., the coverage area) surrounding the base station, using beamforming, and may determine a number of UE signals received in each of the multiple directions, where each of the multiple directions corresponds to a respective unit angular region. For example, if 10 unit angular regions of the same angular range size exist within the total angular region surrounding the base station, the base station may receive UE signals at 10 different directions respectively corresponding to 10 unit angular regions, to determine a number of UE signals received per unit angular region in each unit angular region. Based on the number of UE signals received per unit angular region, the base station may estimate a number of UEs in each unit angular region. Thus, based on the number of UE signals received per unit angular region, the base station may determine which area is more dense with UEs, such that the base station may divide an area with a higher density of UEs into smaller sub-regions. The UE signals may include at least one of random access signals, scheduling requests, beam training requests, or beam recover requests, which are explained more in detail infra.

In an aspect, the base station may estimate a number of UEs in a particular region (e.g., a particular unit angular range) based on a number of random access signals that the base station has received from the particular region. The random access signal may be transmitted by a UE, and may be a RACH signal. For example, if more random access signals are received from a particular region, the base station may determine that more UEs are present in the particular region. In an aspect, the base station may consider a past history of reception of random access signals at the base station, and may determine whether more random access signals are received from a particular region than another region based on the past history. If the base station determines that the base station receives more random access signals from a particular region, the base station may divide the particular region into a smaller sub-regions than other regions. If the base station determines that the base station receives less random access signals from a particular region, the base station may divide the particular region into a larger sub-regions than other regions.

In an aspect, the base station may determine a number of UEs in a particular region (e.g., a particular unit angular range) based on a number of scheduling requests that the base station received from the particular region. The scheduling request may be transmitted by a UE. In an aspect, the base station may consider a past history of reception of scheduling requests at the base station, and may determine whether more scheduling requests are received from a particular region than another region based on the past history. For example, if more scheduling requests are received from a particular region, the base station may determine that more UEs are present in the particular region. Thus, if the base station receives more scheduling requests from a particular region, the base station may divide the particular region into a smaller sub-regions than other regions. If the base station determines that the base station receives less scheduling requests from a particular region, the base station may divide the particular region into a larger sub-regions than other regions.

In an aspect, the base station may determine a number of UEs in a particular region (e.g., a particular unit angular range) based on a number of beam training requests that the base station receives in the particular region. The beam training request may be transmitted by a UE. In an aspect, the base station may consider a past history of reception of beam training requests at the base station, and may determine whether more beam training requests are received from a particular region than another region based on the past history. For example, if more beam training requests are received from a particular region, the base station may determine that more UEs are present in the particular region. Thus, if the base station receives more beam training requests from a particular region than another region, the base station may divide the particular region into a smaller sub-regions than other regions. If the base station determines that the base station receives less beam training requests from a particular region, the base station may divide the particular region into a larger sub-regions than other regions.

In an aspect, the base station may determine a number of UEs in a particular region (e.g., a particular unit angular range) based on a number of beam recovery requests that the base station receives in the particular region. A beam recovery request may be transmitted by a UE. In an aspect, the base station may consider a past history of reception of beam recovery requests at the base station, and may determine whether more beam recovery requests are received from a particular region than another region based on the past history. For example, if more beam recovery requests are received from a particular region, the base station may determine that more UEs are present in the particular region. Thus, if the base station receives more beam recovery requests from a particular region, the base station may divide the particular region into sub-regions of smaller size than sub-regions for other regions. If the base station determines that the base station receives less beam recovery requests from a particular region, the base station may divide the particular region into sub-regions of greater size than the size of sub-regions for other regions having fewer UEs.

In an aspect, the base station may receive information regarding sub-regions of a surrounding region (e.g., coverage area) of the base station from a network entity. The network entity may be a centralized controller or a master base station in a centralized network, where the master base station is connected to multiple base stations to manage the multiple base stations. In one example, the information received from the network entity may include a density or an expected density of UEs in each region of various regions surrounding the base station. For example, if the surrounding region of the base station is divided into a set of unit angular regions of the same size, the information from the base station may provide a density or the expected density of UEs in each unit angular region. Based on the information received from the network entity, the base station may divide the surrounding region into multiple sub-regions.

In one use example, if an mmW base station is located near a subway station, the mmW base station may determine that a surrounding region includes a first region covering the subway station and a second region not covering the subway station. Then, the base station may divide the first angular region covering the subway station into first sub-regions of a first size and may divide the second angular region not covering the subway station into second sub-regions of a second size, where the first sub-regions are smaller than the second sub-regions. More UEs, e.g., carried by people, are expected in the entry area and/or the exit area of the subway station. Therefore, the mmW base station may determine that the first angular region has a higher expected density of UEs than the second angular region, and thus the mmW base station may determine the first sub-regions are smaller than the second sub-regions based on expected UE density.

Figure 10:
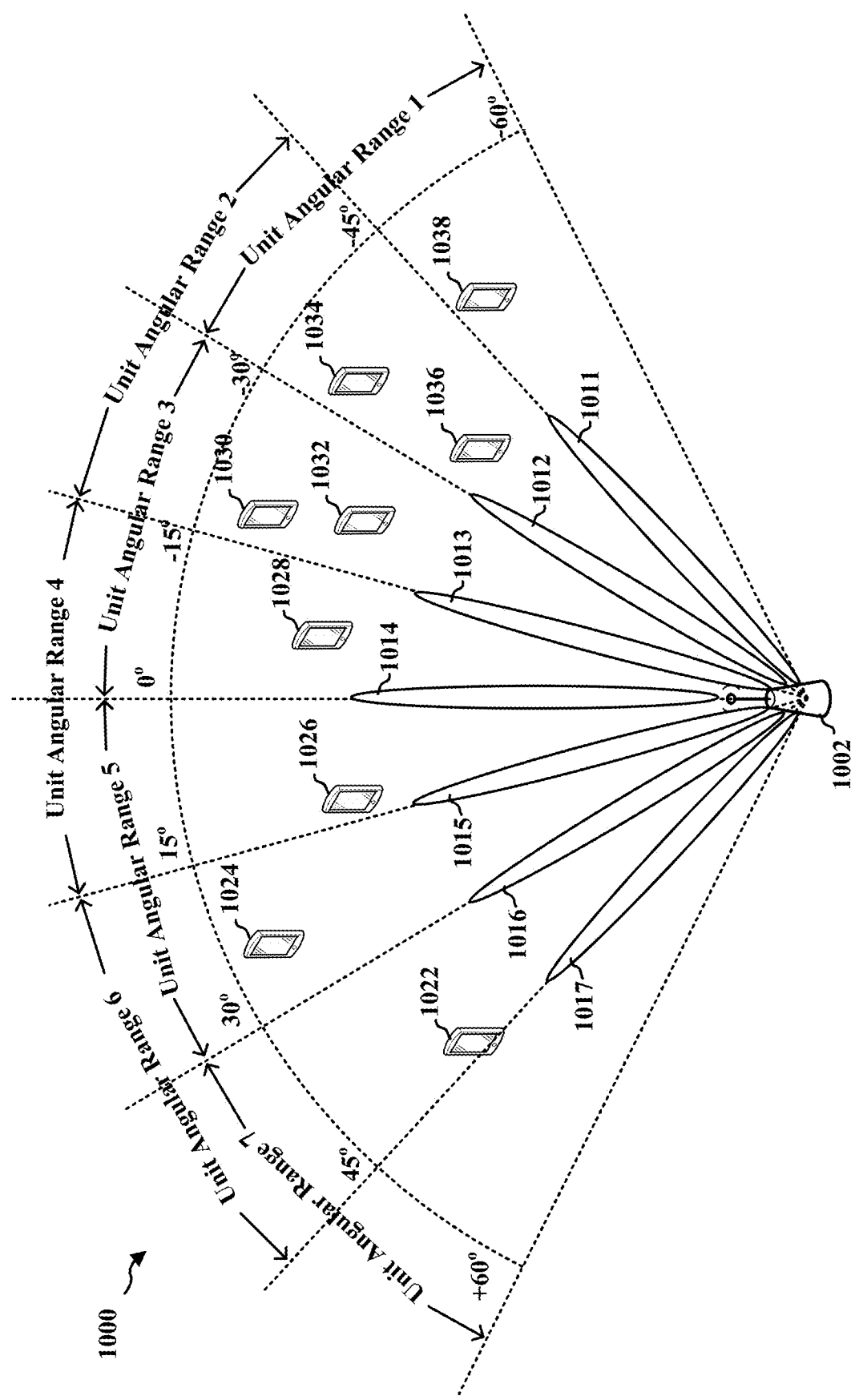
FIG. 10 is an example diagram illustrating an approach to estimate a number of UEs in unit angular ranges.

FIG. 10 is an example diagram 1000 illustrating an approach to estimate a number of UEs in unit angular ranges. In the example diagram 1000 of FIG. 10, the base station 1002 is capable of transmitting within a surrounding angular region (e.g., coverage region) between −60 degrees to 60 degrees. The base station may initially divide the surrounding angular region into a set of unit angular ranges of the same size, where each unit angular range is 30 degrees. The base station 1002 may transmit and/or receive signals in a beamformed manner (e.g., via a beam), sweeping through various angular ranges between −60 degrees to 60 degrees. In the example diagram 100 of FIG. 10, the base station 1002 may receive signals in each direction corresponding to a respective unit angular range, where an angular difference between two adjacent unit angular ranges is 15 degrees. Thus, the base station 1002 may sweep between −60 degrees to 60 degrees with a beam using beamforming, receiving signals at every 15 degrees.

In particular, for a first unit angular range ranging from −60 to −30 degrees, the base station 1002 may receive signals at a first beam direction 1011 at −45 degrees, and may estimate that a number of UEs in the first unit angular range is three (e.g., due to signals from UEs 1034, 1036, and 1038) based on the received signals. For a second unit angular range ranging from −45 to −15 degrees, the base station 1002 may receive signals at a second beam direction 1012 at −30 degrees, and may estimate that a number of UEs in the first unit angular range is four (e.g., due to signals from UEs 1030, 1032, 1034, and 1036) based on the received signals. For a third unit angular range ranging from −30 to 0 degree, the base station 1002 may receive signals at a third beam direction 1013 at −15 degrees, and may estimate that a number of UEs in the first unit angular range is three (e.g., due to signals from UEs 1028, 1030, and 1032) based on the received signals. For a fourth unit angular range ranging from −15 to 15 degrees, the base station 1002 may receive signals at a fourth beam direction 1014 at 0 degree, and may estimate that a number of UEs in the first unit angular range is two (e.g., due to signals from UEs 1026 and 1028) based on the received signals. For a fifth unit angular range ranging from 0 to 30 degrees, the base station 1002 may receive signals at a fifth beam direction 1015 at 15 degree, and may estimate that a number of UEs in the first unit angular range is two (e.g., due to signals from UEs 1024 and 1026) based on the received signals. For a sixth unit angular range ranging from 15 to 45 degrees, the base station 1002 may receive signals at a sixth beam direction 1016 at 30 degree, and may estimate that a number of UEs in the first unit angular range is two (e.g., due to signals from UEs 1022 and 1024) based on the received signals. For a seventh unit angular range ranging from 30 to 60 degrees, the base station 1002 may receive signals at a sixth beam direction 1017 at 45 degree, and may estimate that a number of UEs in the first unit angular range is one (e.g., due to a signal from the UE 1022) based on the received signals.

Thus, in the example of FIG. 10, the number of UEs per unit angular range for the first, second and third unit angular ranges is three or four, while the number of UEs per unit angular ranges for the fourth, fifth, sixth and seventh unit angular ranges is one or two. Because the first, second, and third unit angular ranges has more UEs per unit angular range than the other unit angular ranges, the base station 1002 may determine that sub-regions within the angular region between −60 degrees and 0 degree are smaller than another sub-region within the angular region between 0 and 60 degrees, as described infra, for example.

Figure 11:
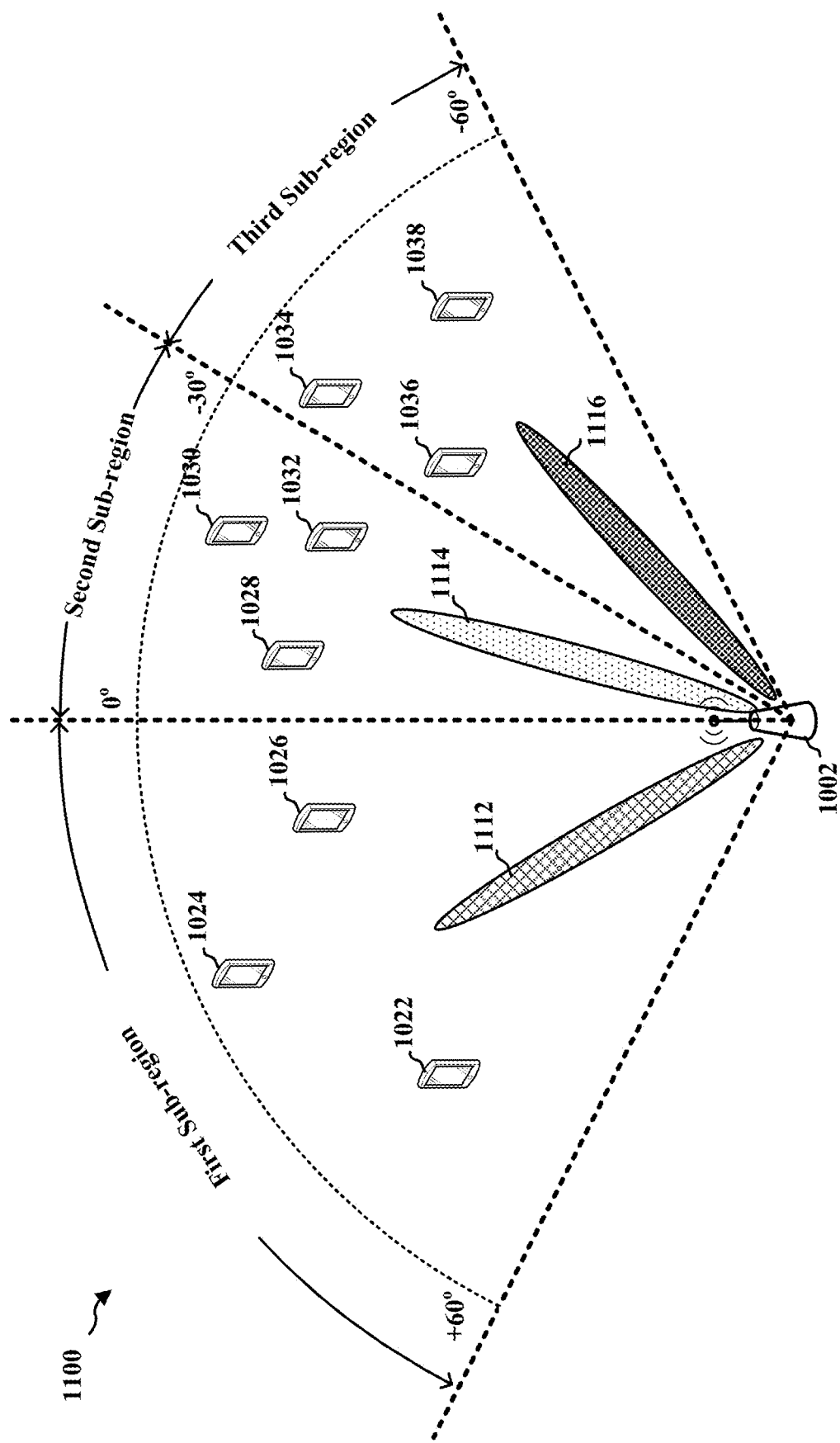
FIG. 11 is an example diagram illustrating a non-uniform sub-regions surrounding a base station.

FIG. 11 is an example diagram 1100 illustrating a non-uniform sub-regions surrounding a base station. In the example diagram 1100 of FIG. 11, the base station 1002 is capable of transmitting within a surrounding angular region between −60 degrees to 60 degrees. The base station 1002 has resources to utilize three beams, and thus, the base station 1002 may divide the surrounding angular region into three sub-regions. The UEs 1022, 1024, and 1026 are sparsely distributed, while UEs 1028, 1030, 1032, 1034, 1036 and 1038 are densely populated. Thus, as discussed above in association with FIG. 10, the base station 1002 may determine a larger sub-region for UEs 1022, 1024, and 1026 in the angular region between 0 degree and 60 degrees, and smaller sub-regions for UEs 1028, 1030, 1032, 1034, 1036 and 1038 in the angular region between −60 degrees and 0 degree. In particular, the base station 1002 may divide the surrounding angular region into a first sub-region covering an angular region between 0 and 60 degrees, a second sub-region covering an angular region between 0 and −30 degrees, and a third sub-region covering an angular region between −30 and −60 degrees.

In FIG. 11, the base station 1002 assigns a first beam 1112 to the first sub-region, a second beam 1114 to the second sub-region, and a third beam 1116 to the third sub-region. Thus, in the example diagram 1100 of FIG. 11, the area surrounding the base station 1002 is divided into non-uniform sub-regions such that one beam is assigned to each sub-region, where three UEs are located in each sub-region. The base station may steer each beam in a direction corresponding to a mid-point angle in a corresponding sub-region. For example, the first beam 1112 may be at 45 degrees to provide angular coverage from 0 degrees to 60 degrees, the second beam 1114 may be at −15 degrees to provide angular coverage from 0 degrees to −30 degrees, and the third beam 1116 may be at −45 degrees top provide angular coverage from −30 degrees to −60 degrees. The base station 1002 may utilize the first beam 1112 to transmit the initial access signal in a direction corresponding to the first sub-region, may utilize the second beam 1114 to transmit the initial access signal in a direction corresponding to the second sub-region, and may utilize the third beam 1116 to transmit the initial access signal in a direction corresponding to the third sub-region. In an aspect, the base station may use the same transmission rate for the first beam 1112, the second beam 1114, and the third beam 1116.

Figure 12:
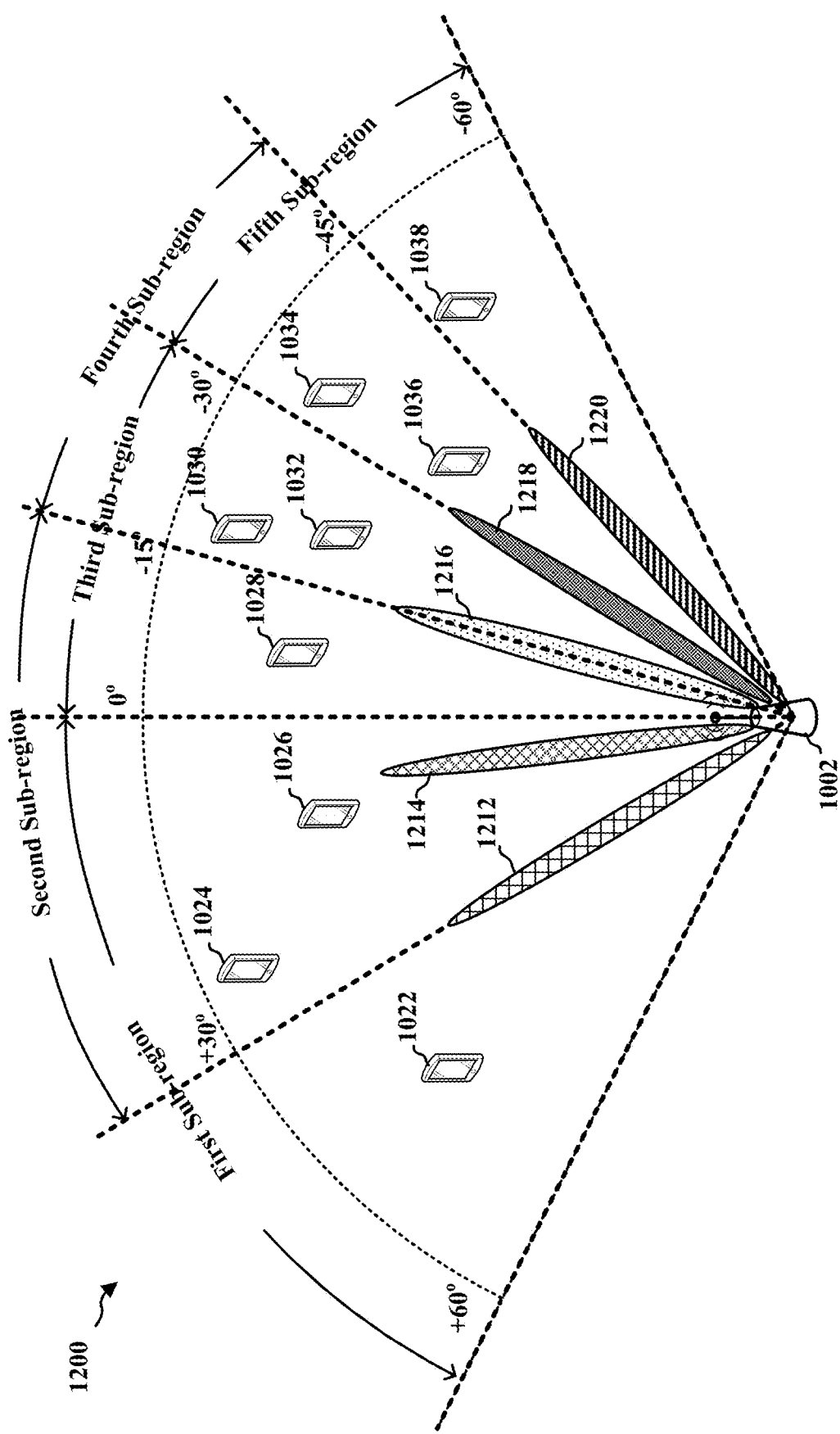
FIG. 12 is an example diagram illustrating a non-uniform sub-regions surrounding a base station

FIG. 12 is an example diagram 1200 illustrating a non-uniform sub-regions surrounding a base station. In the example diagram 1200 of FIG. 12, the base station 1002 is capable of transmitting within a surrounding angular region between −60 degrees to 60 degrees. In the example diagram 1200 of FIG. 12, the base station 1002 has resources to utilize five beams, and thus, the base station 1002 may divide the surrounding angular region into five sub-regions. The UEs 1022, 1024, and 1026 are sparsely distributed, while UEs 1028, 1030, 1032, 1034, 1036 and 1038 are densely populated. Thus, as discussed above in association with FIG. 10, the base station 1002 may determine a largest sub-region for UEs 1022, 1024, and 1026 in the angular region between 0 degree and 60 degrees, and smaller sub-regions to cover the remaining UEs in different angular regions. In particular, the base station 1002 may divide the surrounding angular region into a first sub-region covering an angular region between 60 and 0 degree, a second sub-region covering an angular region between 30 and −15 degrees, a third sub-region covering an angular region between 0 and −30 degrees, a fourth sub-region covering an angular region between −15 and −45 degrees, and a fifth sub-region covering an angular region between −30 and −60 degrees. As illustrated in FIG. 12, different sub-regions may overlap with each other at least in part.

In FIG. 12, the base station 1002 assigns a first beam 1212 to the first sub-region, a second beam 1214 to the second sub-region, a third beam 1216 to the third sub-region, a fourth beam 1218 to the fourth sub-region, a fifth beam 1220 to the fifth sub-region. Thus, in the example diagram 1200 of FIG. 12, the area surrounding the base station 1002 is divided into non-uniform sub-regions such that one beam is assigned to each sub-region, where approximately three UEs are located in each sub-region. The base station may steer each beam in a direction corresponding to a mid-point angle in a corresponding sub-region. For example, the first beam 1212 may be at 45 degrees to provide angular coverage from 0 degrees to 60 degrees, the second beam 1214 may be at 7.5 degrees to provide angular coverage from 30 degrees to −15 degrees, the third beam 1216 may be at −15 degrees to provide angular coverage from 0 degrees to −30 degrees, the fourth beam 1218 may be at −30 degrees top provide angular coverage from −15 degrees to −45 degrees, and the fifth beam 1220 may be at −45 degrees top provide angular coverage from −30 degrees to −60 degrees. The base station 1002 may utilize the first beam 1212 to transmit the initial access signal in a direction corresponding to the first sub-region, may utilize the second beam 1214 to transmit the initial access signal in a direction corresponding to the second sub-region, may utilize the third beam 1216 to transmit the initial access signal in a direction corresponding to the third sub-region, may utilize the fourth beam 1218 to transmit the initial access signal in a direction corresponding to the fourth sub-region, and may utilize the fifth beam 1220 to transmit the initial access signal in a direction corresponding to the fifth sub-region. In an aspect, the base station may use the same transmission rate for the first beam 1212, the second beam 1214, the third beam 1216, the fourth beam 1218, and the fifth beam 1220.

Figure 13:
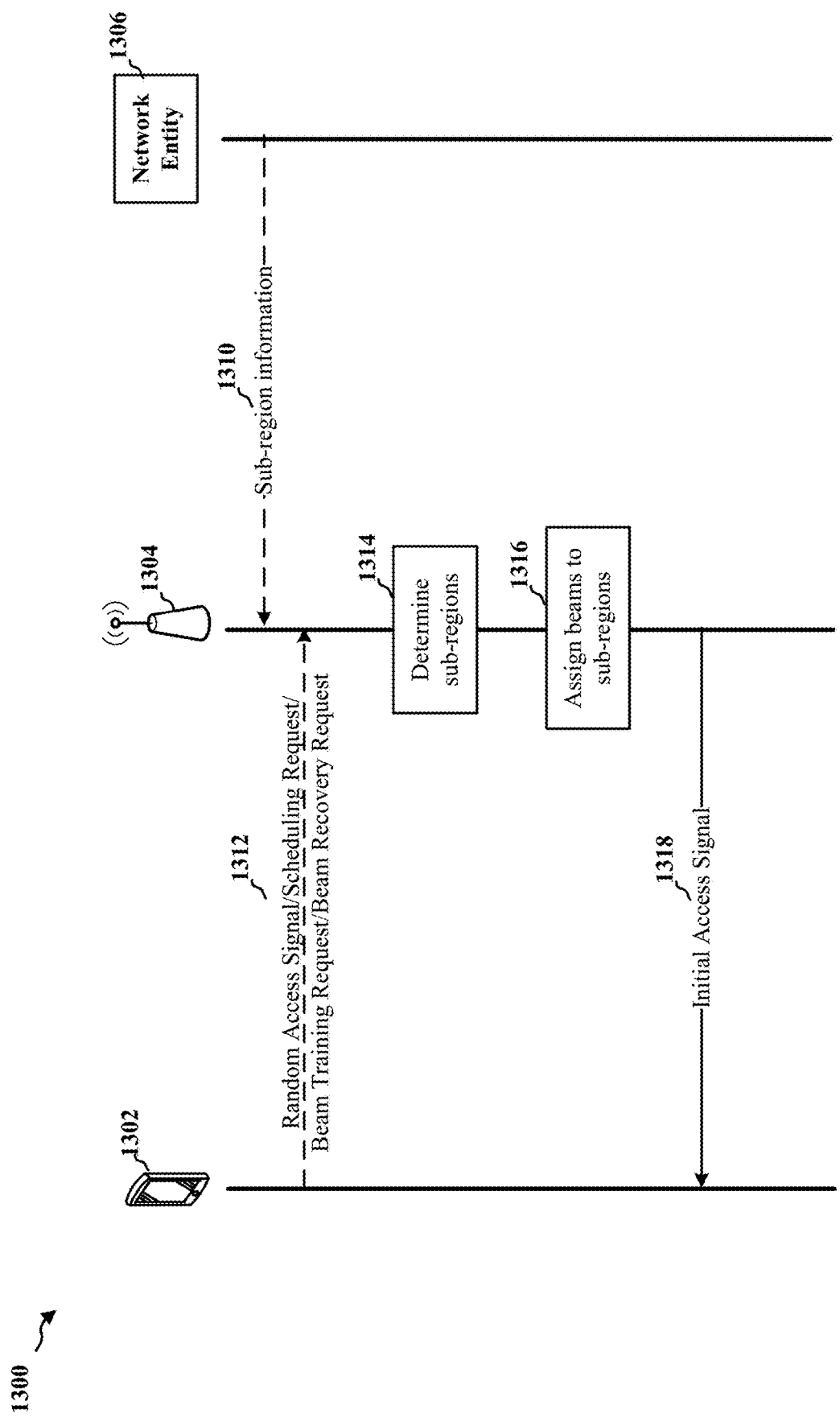
FIG. 13 is a diagram illustrating an example process according to an aspect of the disclosure

FIG. 13 is a diagram 1300 illustrating an example overall process according to an aspect of the disclosure. The example diagram 1300 involves communication among a UE 1302, a base station 1304, and a network entity 1306. The base station 1304 may be an mmW base station capable of communicating in a beam-formed manner (e.g., using directional beams). At 1310, in an aspect, the base station 1304 may receive, from the network entity 1306, information about various sub-regions of a surrounding region of the base station. At 1312, in an aspect, the base station 1304 may receive, from the UE 1302, UE signals including at least one of a random access signal, a scheduling request, a beam training request, or a beam recovery request. At 1314, the base station 1304 determines sub-regions for a region surrounding the base station 1304 and divides the surrounding region into the sub-regions. The base station 1304 may determine the sub-regions based on the information received from the network entity 1306 and/or the number of random access signals/scheduling requests/beam training requests/beam recovery requests received from the UE 1302 and other UEs in various regions. At 1306, the base station assigns each beam of the base station to a respective sub-region of the sub-regions. At 1318, the base station transmits an initial access signal to the UE 1302 using a beam corresponding to the sub-region in which the UE 1302 is located.

Figure 14:
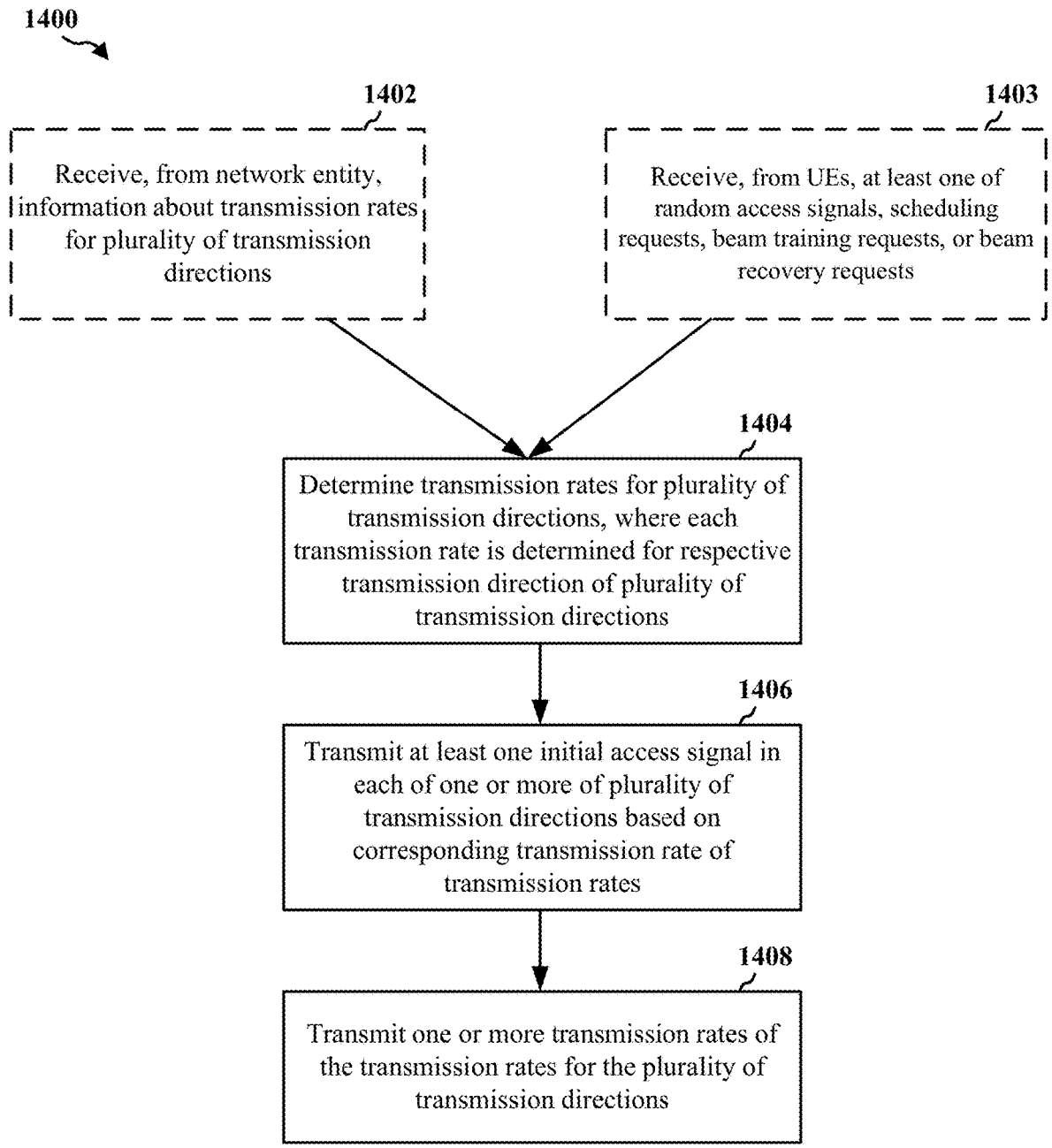
FIG. 14 is a flowchart of a method of wireless communication, according to an aspect of the disclosure.

FIG. 14 is a flowchart 1400 of a method of wireless communication. The method may be performed by a base station (e.g., the base station 102, 702, 802, 904, the apparatus 1602/1602'). In an aspect, at 1402, the base station may receive, from a network entity, information about the plurality of transmission rates for the plurality of transmission directions. In an aspect, the transmission rates may be determined based on the received information from the network entity. For example, as discussed supra, the base station may receive information regarding transmission rates for different transmission directions from a network entity. In an aspect, the network entity may be a centralized controller or a second base station. For example, as discussed supra, the network entity may be a centralized controller or a master base station in a centralized network, where the master base station is connected to multiple base stations to manage the multiple base stations. In an aspect, the second base station may include information regarding a number of user equipments aligned in each of the plurality of transmission directions. For example, as discussed supra, the master base station may include information regarding a number of UEs aligned in each of the plurality of transmission directions.

In an aspect, at 1403, the base station may receive, from UEs, at least one of random access signals, scheduling requests, beam training requests, or beam recovery requests. For example, as discussed supra, the base station may receive at least one of random access signals, scheduling requests, beam training requests, or beam recovery requests (e.g., in a particular transmission direction).

At 1404, the base station determines a plurality of transmission rates, each transmission rate for a respective transmission direction of a plurality of transmission directions. In an aspect, each transmission direction of the plurality of transmission directions corresponds with a respective transmission beam of the base station. For example, as discussed supra, the base station may configure a transmission rate of an initial access signal from the base station for a particular transmission direction of a beam (or a group of beams).

In an aspect, the transmission rate for each transmission direction of the plurality of transmission directions may be determined based on a number of user equipments aligned in the transmission direction. For example, as discussed supra, the base station may determine a transmission rate for a particular transmission direction based on a number of UEs aligned in a particular transmission direction. In an aspect, the transmission rate for each transmission direction of the plurality of transmission directions may be determined based on a number of random access signals received in the transmission direction. For example, as discussed supra, the base station may determine a transmission rate for a particular direction based on a number of random access signal that the base station has received in the particular direction. In an aspect, the transmission rate for each transmission direction of the plurality of transmission directions may be determined based on a number of scheduling requests received in the transmission direction. For example, as discussed supra, the base station may determine the a transmission rate in a particular transmission direction based on a number of scheduling requests that the base station receives in the particular transmission direction. In an aspect, the transmission rate for each transmission direction of the plurality of transmission directions may be determined based on at least one of a number of beam training requests or a number of beam recovery requests. For example, as discussed supra, the base station may determine the a transmission rate in a particular transmission direction based on a number of beam training requests that the base station receives in the particular transmission direction.

At 1406, the base station transmits at least one initial access signal in one or more transmission directions of the plurality of transmission directions based on the transmission rate of each transmission direction of the one or more transmission directions. For example, as discussed supra, the base station may transmit the initial access signal using the configured transmission rate for the particular transmission direction. In an aspect, the at least one initial access signal may be transmitted via a millimeter wave transmission. In an aspect, the at least one initial access signal may include at least one of a primary synchronization signal, a secondary synchronization signal, an extended synchronization signal, a physical broadcast channel, or a beam reference signal. For example, as discussed supra, a base station may transmit initial access signals (e.g., a PSS, an SSS, an ESS, a PBCH, a BRS) to the UE to establish a connection between the base station.

At 1408, the base station may transmit one or more transmission rates of the plurality of transmission rates for the plurality of transmission directions. For example, as discussed supra, the base station may transmit the base station's transmission rates for different transmission directions to one or more UEs. In an aspect, the one or more transmission rates may be transmitted via at least one of a broadcast transmission or a unicast transmission. In an aspect, the base station may transmit the one or more transmission rates by transmitting, in a first transmission direction of the plurality of the transmission directions, a transmission rate corresponding to the first transmission direction via unicast transmission, where a UE is located in the first transmission direction. For example, as discussed supra, in one approach, the base station may transmit all of the base station's transmission rates for different transmission directions by broadcasting the base station's transmission rates. For example, as discussed supra, in another approach, the base station may transmit all of the base station's transmission rates for different transmission directions to a UE via a unicast transmission. In an aspect, the one or more transmission rates may be transmitted via at least one of a master information block or a system information block. In such an aspect, the master information block may be transmitted via a physical broadcast channel. In such an aspect, the system information block may be transmitted via at least one of a physical broadcast channel, an extended physical broadcast channel, or RRC communication. For example, as discussed supra, the base station may transmit the information about transmission rates for different transmission directions via a MIB and/or a SIB. For example, as discussed supra, the MIB may be transmitted via a PBCH. For example, as discussed supra, the SIB may be transmitted via at least one of a PBCH, an extended PBCH, or RRC signaling.

Figure 15:
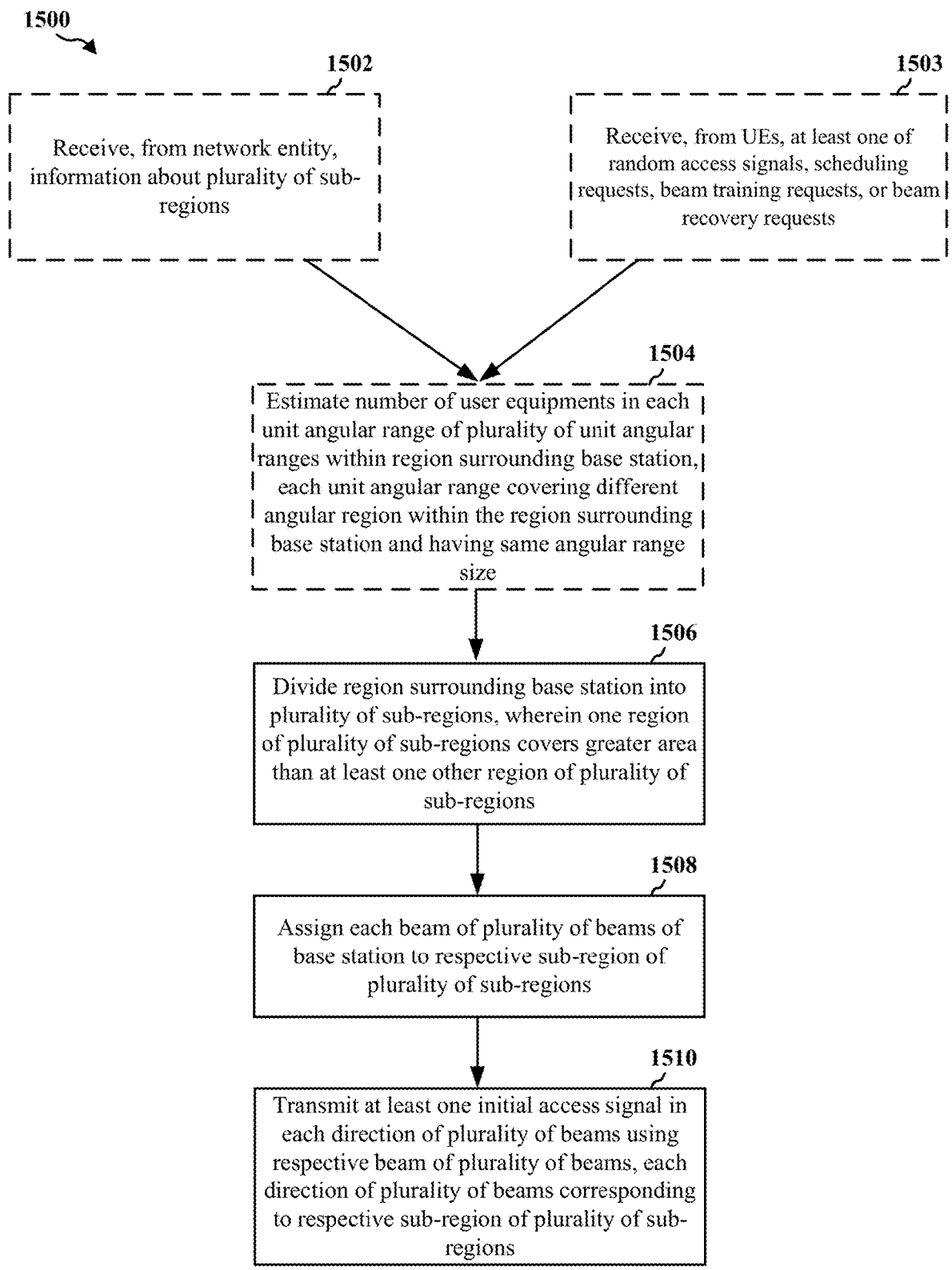
FIG. 15 is a flowchart of a method of wireless communication, according to an aspect of the disclosure.

FIG. 15 is a flowchart 1500 of a method of wireless communication, according to an aspect of the disclosure. The method may be performed by a base station (e.g., the base station 102, 702, 1002, 1304, the apparatus 1602/1602'). In an aspect, at 1502, the base station may receive, from a network entity, information about the plurality of sub-regions, where the region surrounding the base station may be divided into the plurality of sub-regions based on the received information. For example, as discussed supra, the base station may receive information regarding sub-regions of a surrounding region of the base station from a network entity. For example, as discussed supra, based on the information received from the network entity, the base station may divide the coverage region surrounding the base station into multiple sub-regions.

In an aspect, at 1504, the base station may receive one or more user equipment signals in each unit angular range of a plurality of unit angular ranges. For example, as discussed supra, for each unit angular range of different unit angular ranges, the base station may receive UE signals from UEs while a beam of the base station points to a direction corresponding to a corresponding unit angular range.

At 1504, in an aspect, the base station may estimate a number of user equipments in each unit angular range of a plurality of unit angular ranges within the region surrounding the base station, each unit angular range covering a different angular region within the region surrounding the base station and having a same angular range size. For example, as discussed supra, the base station may estimate a number of UEs per unit angular range (e.g., density of UEs) through various angular regions surrounding the base station based on the UE signals received by the base station using a beam pointing to each unit angular rage, where each unit angular range may have the same angular range size.

In an aspect, the number of user equipments in each unit angular range of the plurality of unit angular ranges may be estimated based on a number of the user equipment signals received in each unit angular range of the plurality of unit angular ranges. For example, as discussed supra, based on the number of UE signals received per unit angular region, the base station may estimate a number of UEs in each unit angular region. In such an aspect, the one or more user equipment signals may be received in each unit angular range via a beam sweeping through the plurality of unit angular ranges. For example, as discussed supra, based the base station may sweep in multiple directions over the total region surrounding the base station, using beamforming, and may determine a number of UE signals received in each of the multiple directions, where each of the multiple directions corresponds to a respective unit angular region.

In an aspect, the estimation of the number of user equipments in each unit angular range of the plurality of unit angular ranges based on the number of the user equipment signals is based on at least one of: a number of random access signals received in each unit angular range of the plurality of unit angular ranges, a number of scheduling requests received in each unit angular range of the plurality of unit angular ranges, a number of beam training requests received in each unit angular range of the plurality of unit angular ranges, and a number of beam recovery requests received in each unit angular range of the plurality of unit angular ranges. For example, as discussed supra, the base station may determine a number of UEs in a particular region (e.g., a particular unit angular range) based on a number of scheduling requests that the base station has received from the particular region. For example, as discussed supra, the base station may determine a number of UEs in a particular region (e.g., a particular unit angular range) based on a number of scheduling requests that the base station has received from the particular region. For example, as discussed supra, the base station may determine a number of UEs in a particular region (e.g., a particular unit angular range) based on a number of beam training requests that the base station receives in the particular region. For example, as discussed supra, the base station may determine a number of UEs in a particular region (e.g., a particular unit angular range) based on a number of beam recovery requests that the base station receives in the particular region.

At 1506, the base station divides a region surrounding the base station into a plurality of sub-regions, where one region of the plurality of sub-regions covers a greater area than at least one other region of the plurality of sub-regions. For example, as discussed supra, a base station may divide a coverage area surrounding the base station into sub-regions (e.g., based on a density of UEs in various portions of the coverage area), such that the base station may transmit the initial access signal per sub-region (e.g., for each sub-region, using a beam in a direction corresponding to a respective sub-region). In an aspect, the region may be an angular region, and the plurality of sub-regions may be a plurality of angular sub-regions. For example, as discussed supra, the area surrounding the base station may be expressed in an angular range, and each sub-region may cover a respective angular range.

In an aspect, the region surrounding the base station may be divided into the plurality of sub-regions based on the received information from the network entity. For example, as discussed supra, based on the information received from the network entity, the base station may divide the surrounding region into multiple sub-regions.

In an aspect, the region surrounding the base station may be divided into the plurality of sub-regions based on the estimated number of user equipments in each unit angular range of the plurality of unit angular ranges. For example, as discussed supra, based on the number of UE signals received per unit angular region, the base station may determine which area is more dense with UEs, such that the base station may divide an area with a higher density of UEs into smaller sub-regions (e.g., sub regions with smaller angular coverage). In an aspect, the region surrounding the base station may be divided into the plurality of sub-regions such that a sub-region of the plurality of sub-regions that has more user equipments per angular area covers a smaller angular area than a sub-region of the plurality of sub-regions that has less user equipments per angular area. For example, as discussed supra, the base station may identify a first particular region where more UEs per area are present or are likely to be present and may divide the first particular region into smaller sub-regions (e.g., sub-regions with smaller angular coverage). For example, as discussed supra, the base station may identify a second particular region where less UEs per area are present or are likely to be present and may divide the second particular region into one or more larger sub-regions (e.g., sub-regions with higher angular coverage).

At 1508, the base station assigns each beam of a plurality of beams of the base station to a respective sub-region of the plurality of sub-regions. For example, as discussed supra, the base station may assign one beam or one set of beams of the base station per sub-region. In an aspect, the base station may assign each beam of a plurality of beams of the base station by steering each beam of the plurality beams to a respective direction correspond to a respective sub-region of the plurality of sub-regions. For example, as discussed supra, when assigning the beams to sub-regions, the base station may steer each beam such that a direction of each beam aligns with a corresponding sub-region.

At 1510, the base station transmits at least one initial access signal in each direction of the plurality of beams using a respective beam of the plurality of beams, each direction of the plurality of beams corresponding to a respective sub-region of the plurality of sub-regions. For example, as discussed supra, after assigning a beam or a set of beams for each sub-region, the base station may steer beams of the base station in directions corresponding to the sub-regions such that each beam may be used to transmit the initial access signal in a corresponding sub-region, where each beam may cover approximately the same number of UEs. In an aspect, the at least one initial access signal may be transmitted via a millimeter wave transmission. For example, as discussed supra, the beams may be beams of mmW communication, and thus the initial access signal may be transmitted via a mmW transmission. In an aspect, the at least one initial access signal may include at least one of a primary synchronization signal, a secondary synchronization signal, an extended synchronization signal, a physical broadcast channel, a beam reference signal, or a downlink broadcast channel. For example, as discussed supra, an initial access signal may include at least one of a PSS, an SSS, an ESS, a PBCH, or a BRS. In an aspect, at least one initial access signal may be transmitted with the same transmission rate in each direction of the plurality of beams. For example, as discussed supra, for each beam, the same transmission rate may be used to transmit the initial access signal.

Figure 16:
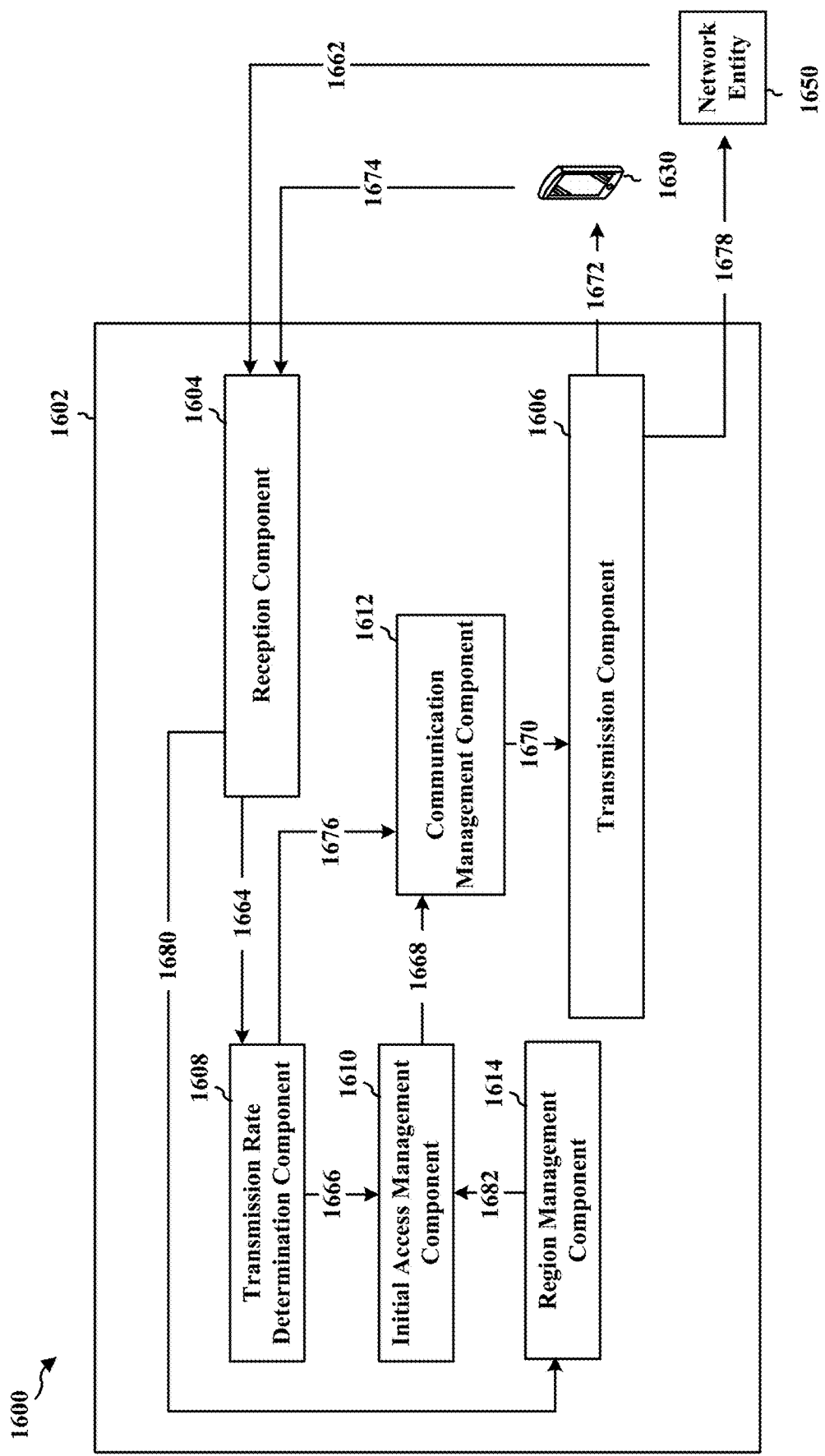
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be a base station. The apparatus includes a reception component 1604, a transmission component 1606, a transmission rate determination component 1608, an initial access management component 1610, a communication management component 1612, and a region management component 1614.

According to one aspect of the disclosure, the transmission rate determination component 1608 determines a plurality of transmission rates, each transmission rate for a respective transmission direction of a plurality of transmission directions. In an aspect, the transmission rate determination component 1608 may receive, from a network entity 1650, via the reception component 1604, information about each transmission rate for each transmission direction of the plurality of transmission directions, and the transmission rate determination component 1608 may determine each transmission rate based on the received information, at 1662 and 1664. In an aspect, the network entity is a centralized controller or a second base station. In an aspect, the second base station includes information regarding a number of user equipments aligned in each of the plurality of transmission directions. In an aspect, each transmission direction of the plurality of transmission directions corresponds with a respective transmission beam of the base station. The transmission rate determination component 1608 may forward the transmission rates to the initial access management component 1610, at 1666.

The initial access management component 1610 transmits, via the communication management component 1612 and the transmission component 1606, at least one initial access signal in one or more transmission directions of the plurality of transmission directions based on the transmission rate of each transmission direction of the one or more transmission directions, to UEs such as the UE 1630, at 1668, 1670, and 1672. In an aspect, the at least one initial access signal is transmitted via a millimeter wave transmission. In an aspect, the at least one initial access signal includes at least one of a primary synchronization signal, a secondary synchronization signal, an extended synchronization signal, a physical broadcast channel, or a beam reference signal.

In an aspect, the transmission rate determination component 1608 may receive, from UEs such as the UE 1630, via the reception component 1604, at least one of random access signals, scheduling requests, beam training requests, or beam recovery requests. In an aspect, the transmission rate for each transmission direction of the plurality of transmission directions is determined (e.g., by the transmission rate determination component 1608) based on a number of user equipments aligned in the transmission direction. In an aspect, the transmission rate for each transmission direction of the plurality of transmission directions is determined (e.g., by the transmission rate determination component 1608) based on a number of random access signals received in the transmission direction (e.g., received via the reception component 1604 from UE(s) such as the UE 1630, at 1674). In an aspect, the transmission rate for each transmission direction of the plurality of transmission directions is determined (e.g., by the transmission rate determination component 1608) based on a number of scheduling requests received in the transmission direction (e.g., received via the reception component 1604 from UE(s) such as the UE 1630, at 1674). In an aspect, the transmission rate for each transmission direction of the plurality of transmission directions is determined (e.g., by the transmission rate determination component 1608) based on at least one of a number of beam training requests or a number of beam recovery requests (e.g., received via the reception component 1604 from UE(s) such as the UE 1630, at 1674).

The transmission rate determination component 1608 may forward the transmission rates to the communication management component 1612, at 1676. The communication management component 1612 transmits, via the transmission component 1606, one or more transmission rates of the plurality of transmission rates for the plurality of transmission directions, to UE(s) such as the UE 1630, at 1670 and 1672. In an aspect, the one or more transmission rates are transmitted via at least one of a broadcast transmission or a unicast transmission. In an aspect, the communication management component 1612 transmits the one or more transmission rates by transmitting, in a first transmission direction of the plurality of the transmission directions, a transmission rate corresponding to the first transmission direction via unicast transmission, where a UE is located in the first transmission direction. In an aspect, the one or more transmission rates are transmitted via at least one of a master information block or a system information block. In such an aspect, the master information block is transmitted via a physical broadcast channel. In such an aspect, the system information block is transmitted via at least one of a physical broadcast channel, an extended physical broadcast channel, or RRC communication. Further, in an aspect, the communication management component 1612 may communicate to the network entity 1650 via the transmission component 1606, at 1670 and 1678.

According to another aspect of the disclosure, the region management component 1614 divides a region surrounding the base station (e.g., apparatus 1602) into a plurality of sub-regions, where one region of the plurality of sub-regions covers a greater area than at least one other region of the plurality of sub-regions. In an aspect, the region may be an angular region, and the plurality of sub-regions may be a plurality of angular sub-regions.

In an aspect, the region management component 1614 may receive, from a network entity (e.g., the network entity 1650), via the reception component 1604, information about the plurality of sub-regions, at 1662 and 1680. In such an aspect, the region surrounding the base station may be divided into the plurality of sub-regions based on the received information from the network entity.

In an aspect, the region management component 1614 may estimate a number of user equipments in each unit angular range of a plurality of unit angular ranges within the region surrounding the base station, each unit angular range covering a different angular region within the region surrounding the base station and having a same angular range size. In such an aspect, the region surrounding the base station may be divided into the plurality of sub-regions based on the estimated number of user equipments in each unit angular range of the plurality of unit angular ranges. In an aspect, at 1404, the region management component 1614 may receive, via the reception component 1604, one or more user equipment signals in each unit angular range of the plurality of unit angular ranges (e.g., from UE 1630, at 1674 and 1680). In an aspect, the number of user equipments in each unit angular range of the plurality of unit angular ranges may be estimated based on a number of the user equipment signals received in each unit angular range of the plurality of unit angular ranges. In such an aspect, the one or more user equipment signals may be received in each unit angular range via a beam sweeping through the plurality of unit angular ranges. In an aspect, the estimation of the number of user equipments in each unit angular range of the plurality of unit angular ranges based on the number of the user equipment signals is based on at least one of: a number of random access signals received in each unit angular range of the plurality of unit angular ranges, a number of scheduling requests received in each unit angular range of the plurality of unit angular ranges, a number of beam training requests received in each unit angular range of the plurality of unit angular ranges, and a number of beam recovery requests received in each unit angular range of the plurality of unit angular ranges. In an aspect, the region surrounding the base station is divided into the plurality of sub-regions such that a sub-region of the plurality of sub-regions that has more user equipments per angular area covers a smaller angular area than a sub-region of the plurality of sub-regions that has less user equipments per angular area.

The region management component 1614 assigns each beam of a plurality of beams of the base station to a respective sub-region of the plurality of sub-regions. In an aspect, the base station may assign each beam of a plurality of beams of the base station by steering each beam of the plurality beams to a respective direction correspond to a respective sub-region of the plurality of sub-regions. The region management component 1614 may forward information about the plurality of sub-regions and the assignment of the plurality of beams to the initial access management component 1610, at 1682.

The initial access management component 1610 transmits, via the communication management component 1612 and the transmission component 1606, at least one initial access signal in each direction of the plurality of beams using a respective beam of the plurality of beams, to UEs such as the UE 1630, at 1668, 1670, and 1572, each direction of the plurality of beams corresponding to a respective sub-region of the plurality of sub-regions. In an aspect, the at least one initial access signal may be transmitted via a millimeter wave transmission. In an aspect, the at least one initial access signal may include at least one of a primary synchronization signal, a secondary synchronization signal, an extended synchronization signal, a physical broadcast channel, a beam reference signal, or a downlink broadcast channel. In an aspect, at least one initial access signal may be transmitted with the same transmission rate in each direction of the plurality of beams.

The apparatus may include additional components that perform each of the blocks of the algorithm in the aforementioned flowcharts of FIGS. 14 and 15. As such, each block in the aforementioned flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
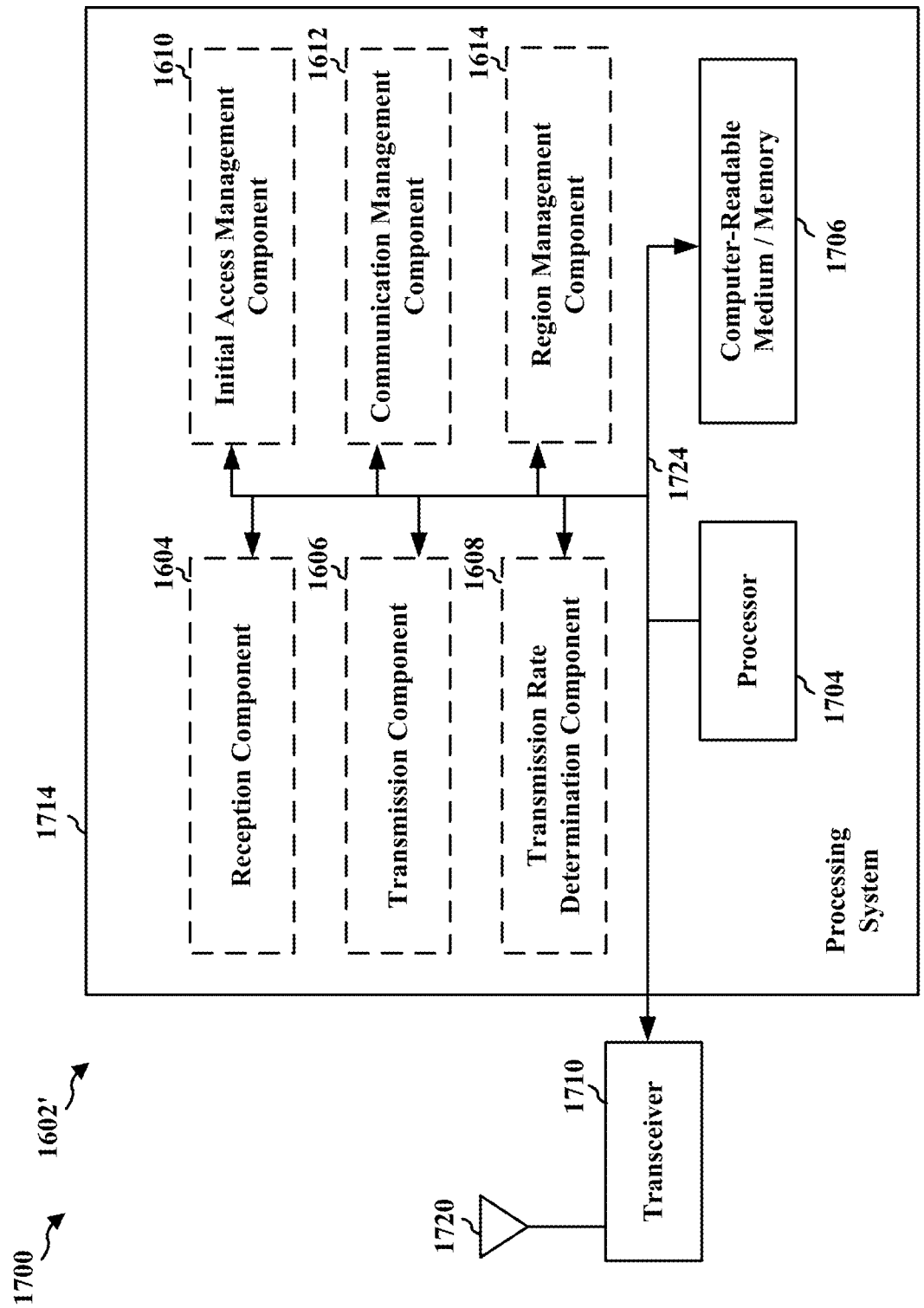
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1611, 1612, 1614, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1611, 1612, 1614. The components may be software components running in the processor 1704, resident/stored in the computer readable medium/memory 1706, one or more hardware components coupled to the processor 1704, or some combination thereof. The processing system 1714 may be a component of the eNB 310 and may include the memory 376 and/or at least one of the TX processor 316, the RX processor 370, and the controller/processor 375.

In one configuration, the apparatus 1602/1602' for wireless communication includes means for determining a plurality of transmission rates, each transmission rate for a respective transmission direction of a plurality of transmission directions, and means for transmitting at least one initial access signal in one or more transmission directions of the plurality of transmission directions based on the transmission rate of each transmission direction of the one or more transmission directions. In an aspect, the apparatus 1602/1602' may further include means for transmitting one or more transmission rates of the plurality of transmission rates for the plurality of transmission directions. In an aspect, the means for transmitting the one or more transmission rates is configured to transmit, in a first transmission direction of the plurality of the transmission directions, a transmission rate corresponding to the first transmission direction via unicast transmission, where a UE is located in the first transmission direction. In an aspect, the apparatus 1602/1602' may further include means for receiving, from a network entity, information about each transmission rate for each transmission direction of the plurality of transmission directions, where each transmission rate is determined based on the received information.

In another configuration, the apparatus 1602/1602' for wireless communication includes means for dividing a region surrounding the base station into a plurality of sub-regions, where one region of the plurality of sub-regions covers a greater area than at least one other region of the plurality of sub-regions, means for assigning each beam of a plurality of beams of the base station to a respective sub-region of the plurality of sub-regions, and means for transmitting at least one initial access signal in each direction of the plurality of beams using a respective beam of the plurality of beams, each direction of the plurality of beams corresponding to a respective sub-region of the plurality of sub-regions. In an aspect, the apparatus 1602/1602' may include means for receiving one or more user equipment signals in each unit angular range of the plurality of unit angular ranges, where the number of user equipments in each unit angular range of the plurality of unit angular ranges is estimated based on a number of the user equipment signals received in each unit angular range of the plurality of unit angular ranges. In an aspect, the means for assigning each beam of the plurality of beams is configured to steer each beam of the plurality beams to a respective direction correspond to a respective sub-region of the plurality of sub-regions. In an aspect, the apparatus 1602/1602' may include means for receiving, from a network entity, information about the plurality of sub-regions, where the region surrounding the base station may be divided into the plurality of sub-regions based on the received information.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 18:
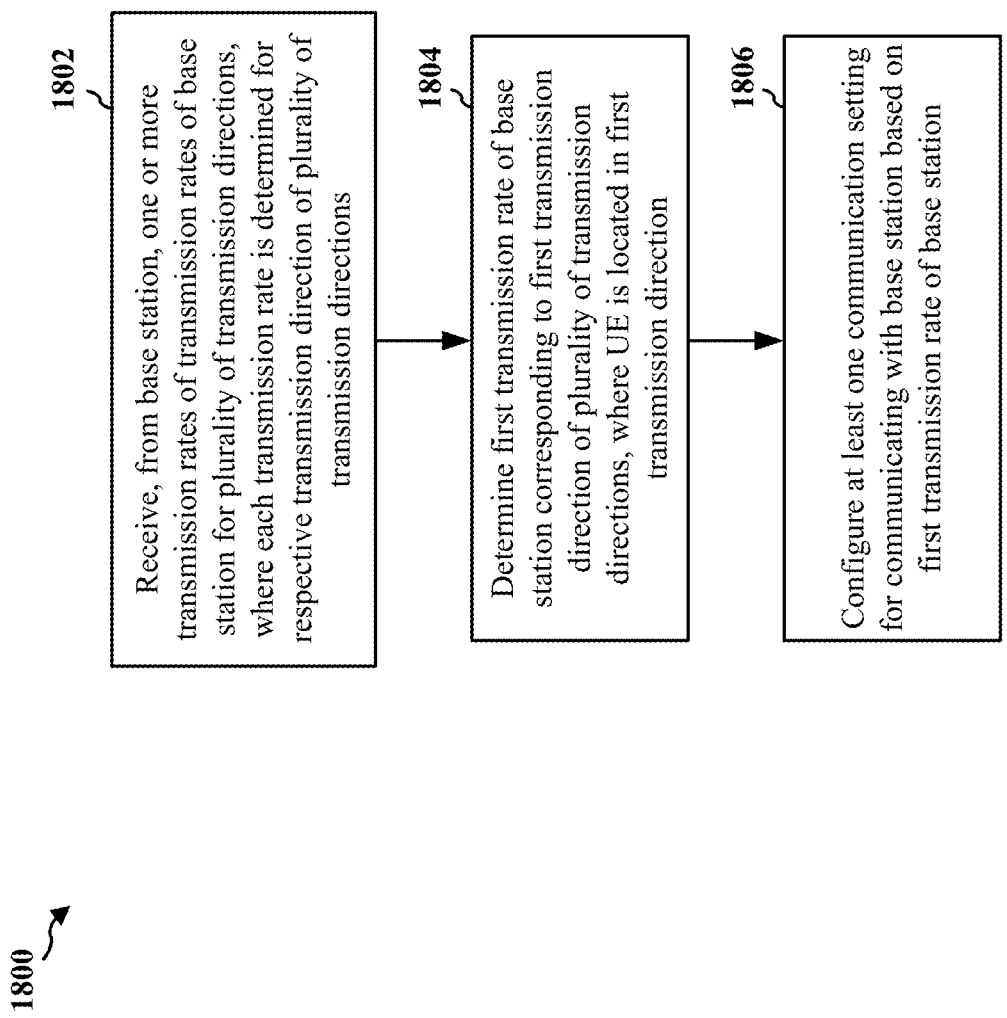
FIG. 18 is a flowchart of a method of wireless communication.

FIG. 18 is a flowchart 1800 of a method of wireless communication. The method may be performed by a UE (e.g., the UE 104, 722, 822, 902, the apparatus 1902/1902'). At 1802, the UE receives, from a base station, one or more transmission rates of the base station for a plurality of transmission directions, where each transmission rate is determined for a respective transmission direction of the plurality of transmission directions. For example, as discussed supra, the base station may transmit the base station's transmission rates for different transmission directions to one or more UEs. In an aspect, the one or more transmission rates may be received via a millimeter wave transmission. In an aspect, the one or more transmission rates may be received via at least one of a broadcast transmission or a unicast transmission. For example, as discussed supra, in one approach, the base station may transmit all of the base station's transmission rates for different transmission directions by broadcasting the base station's transmission rates. For example, as discussed supra, in another approach, the base station may transmit all of the base station's transmission rates for different transmission directions to a UE via a unicast transmission. At 1804, the UE determines a first transmission rate of the base station corresponding to a first transmission direction of the plurality of transmission directions, where the UE is located in the first transmission direction. In an aspect, the UE may receive the one or more transmission rates by receiving, in the first transmission direction, the first transmission rate from the base station. For example, as discussed supra, when the UE receives base station's transmission rate(s), the UE may determine the base station's transmission rate(s) for a particular transmission direction that is aligned with the UE. For example, as discussed supra, the base station may convey to the UE information about the particular direction aligned with the UE and a transmission rate for the particular direction.

At 1806, the UE configures at least one communication setting for communicating with the base station based on the first transmission rate of the base station. For example, as discussed supra, based on the base station's transmission rate(s), a UE may configure certain communication settings for communicating with the base station. In an aspect, the at least one communication setting may include an activation time of the UE to activate a connection of the UE with the base station. In such an aspect, the UE may activate the connection with the base station in response to receiving paging information from the base station. In such an aspect, the activation time of the UE may become more frequent as the first transmission rate of the base station increases. For example, as discussed supra, the UE may configure an activation time to indicate how often to wake up to activate a connection of the UE with the base station, based on a transmission rate of the base station for a particular transmission direction aligned with the UE. For example, as discussed supra, the UE may determine to wake up more often if the transmission rate of the base station is higher for the particular transmission direction where the UE is aligned.

In an aspect, the one or more transmission rates may be received via at least one of a master information block or a system information block. In such an aspect, the master information block may be received via a physical broadcast channel. In such an aspect, the system information block may be received via at least one of a physical broadcast channel, an extended physical broadcast channel, or radio resource control (RRC) communication. For example, as discussed supra, the base station may transmit (to the UE) the information about transmission rates for different transmission directions via a MIB and/or a SIB. For example, as discussed supra, the MIB may be transmitted via a PBCH. For example, as discussed supra, the SIB may be transmitted via at least one of a PBCH, an extended PBCH, or RRC signaling.

Figure 19:
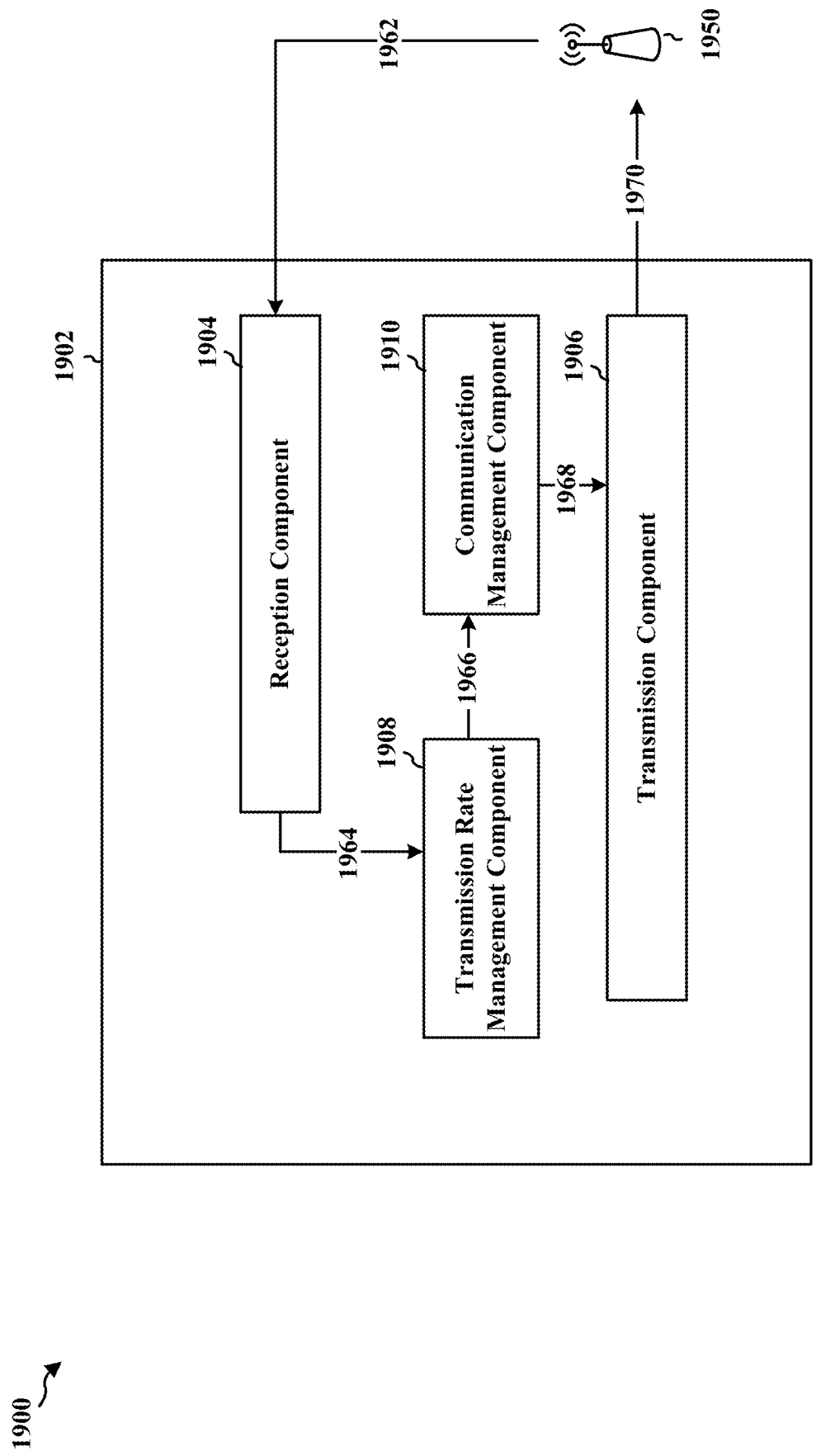
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be a UE. The apparatus includes a reception component 1904, a transmission component 1906, a transmission rate management component 1908, and a communication management component 1910.

The transmission rate management component 1908 receives via the reception component 1904, from a base station (e.g., base station 1950), one or more transmission rates of the base station for a plurality of transmission directions, at 1962 and 1964, where each transmission rate is determined for a respective transmission direction of the plurality of transmission directions. In an aspect, the one or more transmission rates are received via a millimeter wave transmission. In an aspect, the one or more transmission rates are received via at least one of a broadcast transmission or a unicast transmission. The transmission rate management component 1908 determines a first transmission rate of the base station corresponding to a first transmission direction of the plurality of transmission directions, where the UE is located in the first transmission direction. In an aspect, the transmission rate management component 1908 may receive the one or more transmission rates by receiving, in the first transmission direction, the first transmission rate from the base station. The transmission rate management component 1908 may forward the first transmission rate of the base station to the communication management component 1910, at 1966.

The communication management component 1910 configures (e.g., via the transmission component 1906, at 1968) at least one communication setting for communicating with the base station based on the first transmission rate of the base station. The communication management component 1910 may communicate to the base station 1950 via the transmission component 1906, at 1970, based on the communication setting. In an aspect, the at least one communication setting comprises an activation time of the UE to activate a connection of the UE with the base station. In such an aspect, the UE activates the connection with the base station in response to receiving paging information from the base station. In such an aspect, the activation time of the UE becomes more frequent as the first transmission rate of the base station increases In an aspect, the one or more transmission rates are received via at least one of a master information block or a system information block. In such an aspect, the master information block is received via a physical broadcast channel. In such an aspect, the system information block is received via at least one of a physical broadcast channel, an extended physical broadcast channel, or RRC communication.

The apparatus may include additional components that perform each of the blocks of the algorithm in the aforementioned flowcharts of FIG. 18. As such, each block in the aforementioned flowcharts of FIG. 18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
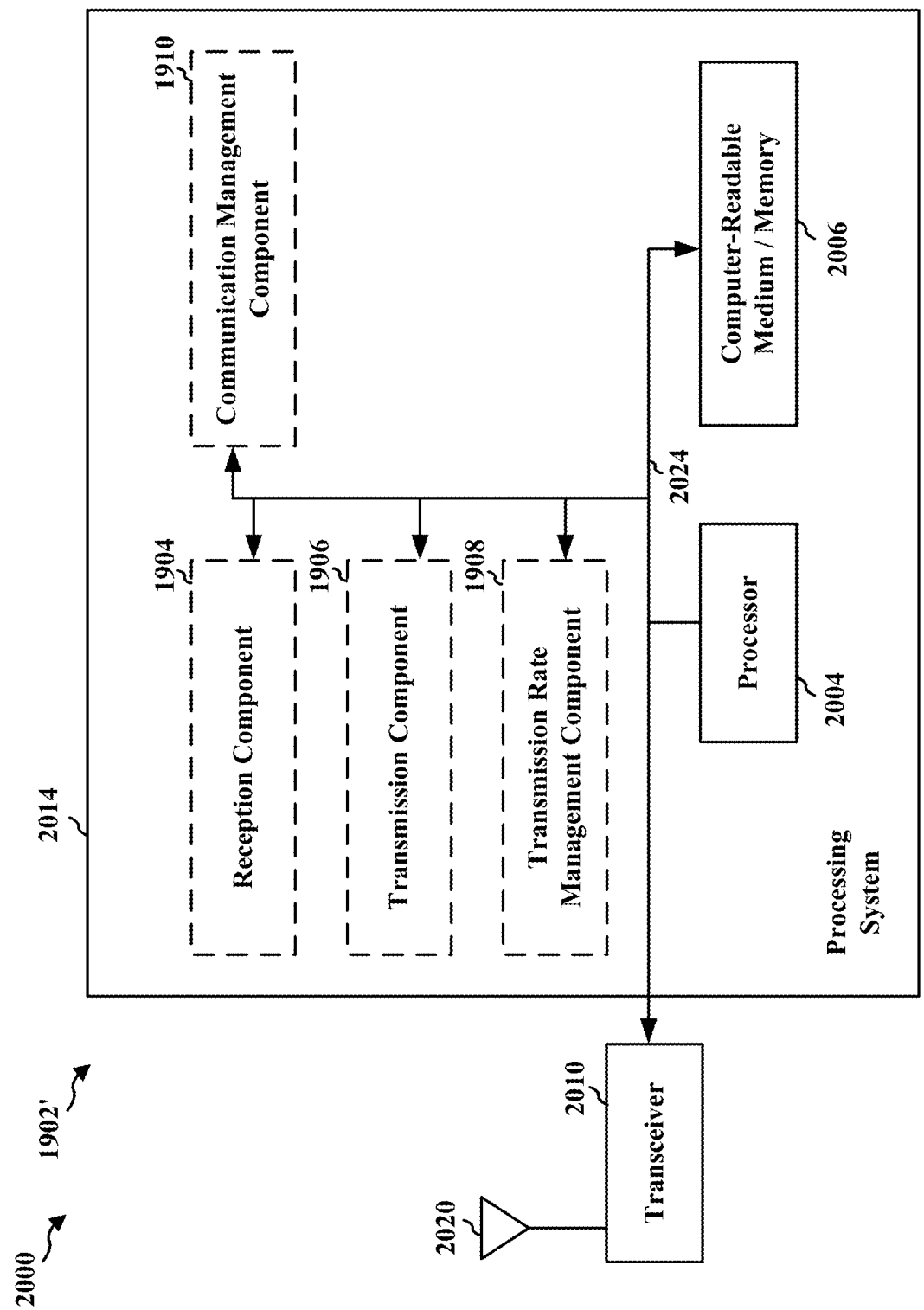
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1906, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910. The components may be software components running in the processor 2004, resident/stored in the computer readable medium/memory 2006, one or more hardware components coupled to the processor 2004, or some combination thereof. The processing system 2014 may be a component of the UE 350 and may include the memory 360 and/or at least one of the TX processor 368, the RX processor 356, and the controller/processor 359.

In one configuration, the apparatus 1902/1902' for wireless communication includes means for receiving, from a base station, one or more transmission rates of the base station for a plurality of transmission directions, where each transmission rate is determined for a respective transmission direction of the plurality of transmission directions, means for determining a first transmission rate of the base station corresponding to a first transmission direction of the plurality of transmission directions, where the UE is located in the first transmission direction, and means for configuring at least one communication setting for communicating with the base station based on the first transmission rate of the base station. In an aspect, the means for receiving the one or more transmission rates is configured to receive, in the first transmission direction, the first transmission rate from the base station.

The aforementioned means may be one or more of the aforementioned components of the apparatus 1902 and/or the processing system 2014 of the apparatus 1902' configured to perform the functions recited by the aforementioned means. As described supra, the processing system 2014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a base station, comprising:
    determining a plurality of transmission rates, each transmission rate for a respective transmission direction of a plurality of transmission directions; and
    transmitting at least one access signal in one or more transmission directions of the plurality of transmission directions based on the transmission rate of each transmission direction of the one or more transmission directions, wherein the at least one access signal is transmitted via a millimeter wave transmission;
    wherein each transmission direction of the plurality of transmission directions corresponds with a respective transmission beam of the base station.

2. The method of claim 1, wherein the at least one access signal includes at least one of a primary synchronization signal, a secondary synchronization signal, an extended synchronization signal, a physical broadcast channel, or a beam reference signal.

3. The method of claim 1, wherein the transmission rate for each transmission direction of the plurality of transmission directions is determined based on at least one of:
a number of user equipments aligned in the transmission direction,
a number of random access signals received in the transmission direction,
a number of scheduling requests received in the transmission direction, or
at least one of a number of beam training requests or a number of beam recovery requests.

4. The method of claim 1, further comprising:
transmitting one or more transmission rates of the plurality of transmission rates for the plurality of transmission directions.

5. The method of claim 4, wherein the transmitting the one or more transmission rates comprises:
transmitting, in a first transmission direction of the plurality of transmission directions, a transmission rate corresponding to the first transmission direction via unicast transmission, wherein a UE is located in the first transmission direction.

6. The method of claim 4, wherein the one or more transmission rates are transmitted via at least one of a master information block or a system information block.

7. The method of claim 1, further comprising:
receiving, from a network entity, information about each transmission rate for each transmission direction of the plurality of transmission directions,
wherein each transmission rate is determined based on the received information.

8. A method of wireless communication by a user equipment (UE), comprising:
receiving, from a base station, one or more transmission rates of the base station for a plurality of transmission directions, wherein each transmission rate is determined for a respective transmission direction of the plurality of transmission directions, wherein each transmission direction of the plurality of transmission directions corresponds with a respective transmission beam, wherein the one or more transmission rates are received via a millimeter wave transmission;
determining a first transmission rate of the base station corresponding to a first transmission direction of the plurality of transmission directions, wherein the UE is located in the first transmission direction; and
configuring at least one communication setting for communicating with the base station based on the first transmission rate of the base station.

9. The method of claim 8, wherein the at least one communication setting comprises an activation time of the UE to activate a connection of the UE with the base station.

10. The method of claim 9, wherein the activation time of the UE becomes more frequent as the first transmission rate of the base station increases.

11. The method of claim 8, wherein the receiving the one or more transmission rates comprises:
receiving, in the first transmission direction, the first transmission rate from the base station.

12. The method of claim 8, wherein the one or more transmission rates are received via at least one of a master information block or a system information block.

13. A base station for wireless communication, comprising:
a memory; and
at least one processor coupled to the memory and configured to:
determine a plurality of transmission rates, each transmission rate for a respective transmission direction of a plurality of transmission directions; and
transmit at least one access signal in one or more transmission directions of the plurality of transmission directions based on the transmission rate of each transmission direction of the one or more transmission directions, wherein the at least one access signal is transmitted via a millimeter wave transmission;
wherein each transmission direction of the plurality of transmission directions corresponds with a respective transmission beam of the base station.

14. The base station of claim 13, wherein the at least one access signal includes at least one of a primary synchronization signal, a secondary synchronization signal, an extended synchronization signal, a physical broadcast channel, or a beam reference signal.

15. The base station of claim 13, wherein the transmission rate for each transmission direction of the plurality of transmission directions is determined based on at least one of:
a number of user equipments aligned in the transmission direction,
a number of random access signals received in the transmission direction,
a number of scheduling requests received in the transmission direction, or
at least one of a number of beam training requests or a number of beam recovery requests.

16. The base station of claim 13, wherein the at least one processor is further configured to:
transmit one or more transmission rates of the plurality of transmission rates for the plurality of transmission directions.

17. The base station of claim 16, wherein the at least one processor configured to transmit the one or more transmission rates is configured to:
transmit, in a first transmission direction of the plurality of the transmission directions, a transmission rate corresponding to the first transmission direction via unicast transmission, wherein a UE is located in the first transmission direction.

18. The base station of claim 16, wherein the one or more transmission rates are transmitted via at least one of a master information block or a system information block.

19. The base station of claim 13, wherein the at least one processor is further configured to:
receive, from a network entity, information about each transmission rate for each transmission direction of the plurality of transmission directions,
wherein each transmission rate is determined based on the received information.

20. A user equipment (UE) for wireless communication, comprising:
a memory; and
at least one processor coupled to the memory and configured to:
receive, from a base station, one or more transmission rates of the base station for a plurality of transmission directions, wherein each transmission rate is determined for a respective transmission direction of the plurality of transmission directions, wherein each transmission direction of the plurality of transmission directions corresponds with a respective transmission beam of the base station, wherein the one or more transmission rates are received via a millimeter wave transmission;

determine a first transmission rate of the base station corresponding to a first transmission direction of the plurality of transmission directions, wherein the UE is located in the first transmission direction; and configure at least one communication setting for communicating with the base station based on the first transmission rate of the base station.

21. The UE of claim 20, wherein the at least one communication setting comprises an activation time of the UE to activate a connection of the UE with the base station.

22. The UE of claim 21, wherein the activation time of the UE becomes more frequent as the first transmission rate of the base station increases.

23. The UE of claim 20, wherein the at least one processor configured to receive the one or more transmission rates is configured to:

receive, in the first transmission direction, the first transmission rate from the base station.

24. The UE of claim 20, wherein the one or more transmission rates are received via at least one of a master information block or a system information block.

* * * * *